US006803681B2

(12) United States Patent
Faizullabhoy et al.

(10) Patent No.: US 6,803,681 B2
(45) Date of Patent: Oct. 12, 2004

(54) PATH MODULE FOR A LINEAR MOTOR, MODULAR LINEAR MOTOR SYSTEM AND METHOD TO CONTROL SAME

(75) Inventors: Mustansir Faizullabhoy, Stony Brook, NY (US); Anwar Chitayat, Fort Salonga, NY (US); Joseph Cardamone, Shirley, NY (US)

(73) Assignee: Anorad Corporation, Shirley, NY (US)

( * ) Notice: Subject to any disclaimer, the term of this patent is extended or adjusted under 35 U.S.C. 154(b) by 0 days.

(21) Appl. No.: 09/884,410

(22) Filed: Jun. 19, 2001

(65) Prior Publication Data

US 2002/0180279 A1 Dec. 5, 2002

Related U.S. Application Data

(63) Continuation-in-part of application No. 09/415,166, filed on Oct. 8, 1999, now Pat. No. 6,274,952, which is a continuation of application No. 09/069,324, filed on Apr. 29, 1998, now Pat. No. 5,994,798, which is a continuation-in-part of application No. 09/055,573, filed on Apr. 6, 1998, now Pat. No. 5,936,319, and a continuation-in-part of application No. 09/040,132, filed on Mar. 17, 1998, now Pat. No. 5,925,943, and application No. 09/031,287, filed on Feb. 26, 1998, now Pat. No. 5,907,200, and application No. 09/031,009, filed on Feb. 26, 1998, now Pat. No. 5,942,817.

(51) Int. Cl.[7] .............................................. H02K 41/00
(52) U.S. Cl. ........................................ 310/12; 318/135
(58) Field of Search .............................. 310/12, 13, 14; 318/135, 687

(56) References Cited

U.S. PATENT DOCUMENTS

| 4,595,870 | A | | 6/1986 | Chitayat ..................... 318/687 |
|---|---|---|---|---|
| 4,639,648 | A | | 1/1987 | Sakamoto ................... 318/254 |
| 4,689,530 | A | | 8/1987 | Nakamura et al. .......... 318/135 |
| 4,789,815 | A | | 12/1988 | Kobayashi et al. ......... 318/135 |
| 4,825,111 | A | | 4/1989 | Hommes et al. ............... 310/12 |
| 5,023,495 | A | | 6/1991 | Ohsaka et al. ................ 310/12 |
| 5,125,347 | A | * | 6/1992 | Takahashi et al. .......... 104/298 |
| 5,225,725 | A | | 7/1993 | Shiraki et al. ................ 310/12 |
| 5,452,201 | A | * | 9/1995 | Pieronek et al. .............. 700/83 |
| 5,458,047 | A | * | 10/1995 | McCormick ................... 91/361 |
| 5,590,278 | A | * | 12/1996 | Barthel et al. ................ 714/53 |
| 5,644,176 | A | | 7/1997 | Katagiri et al. ............... 310/12 |
| 5,684,344 | A | | 11/1997 | Takei .......................... 310/12 |
| 5,689,164 | A | | 11/1997 | Hoft et al. .................... 310/12 |
| 5,729,251 | A | | 3/1998 | Nakashima ............. 345/173 X |
| 5,757,091 | A | | 5/1998 | Sogabe et al. ................ 310/12 |
| 5,793,128 | A | | 8/1998 | Nanba et al. ................. 310/12 |
| 5,831,352 | A | * | 11/1998 | Takei .......................... 310/12 |
| 5,925,943 | A | | 7/1999 | Chitayat ....................... 310/12 |
| 6,016,044 | A | | 1/2000 | Holdaway ................... 318/696 |
| 6,075,297 | A | * | 6/2000 | Izawa et al. .................. 310/12 |

FOREIGN PATENT DOCUMENTS

| EP | 0939482 A3 | 2/2000 |
|---|---|---|
| JP | 408255355 | 10/1996 |

OTHER PUBLICATIONS

Patent abstracts of Japan, vol. 006, No. 052 (E–100), Apr. 7, 1982 & JP 56 166763 A (Tagahashi Yoshiteru), Dec. 22, 1981.

(List continued on next page.)

*Primary Examiner*—Thanh Lam
*Assistant Examiner*—Judson H. Jones
(74) *Attorney, Agent, or Firm*—Amin & Turocy LLP; John M. Miller

(57) ABSTRACT

A path module for a linear motor system includes a controller coupled to one or more amplifiers that are operative to control associated windings in the module. The controller receives control information via a communications link. The controller controls the amplifier based on the received control information so as to selectively energize the associated windings in the module. In one aspect, a plurality of such modules may be connected together to form a path along which one or more stages are moveable according to energization of the windings in the path.

31 Claims, 26 Drawing Sheets

OTHER PUBLICATIONS

Patent abstracts of Japan, vol. 008, No. 190 (E–263), Aug. 31, 1984 & JP 59 080190 A (Oki Denki Kogyo KK), May 9, 1984).

Patent abstracts of Japan, vol. 018, No. 221 (E–1540), Apr. 20, 1994 & JP 06 020766 A (Matsushita Electric Ind. Co. Ltd), Jan. 28, 1994.

Patent abstracts of Japan, vol. 006, No. 060 (E–102), Apr. 17, 1982 & JP 57 000068 A (Tagahashi Yoshiteru), Jan. 5, 1982.

European Search Report EP 99 30 1427, date unknown.

* cited by examiner

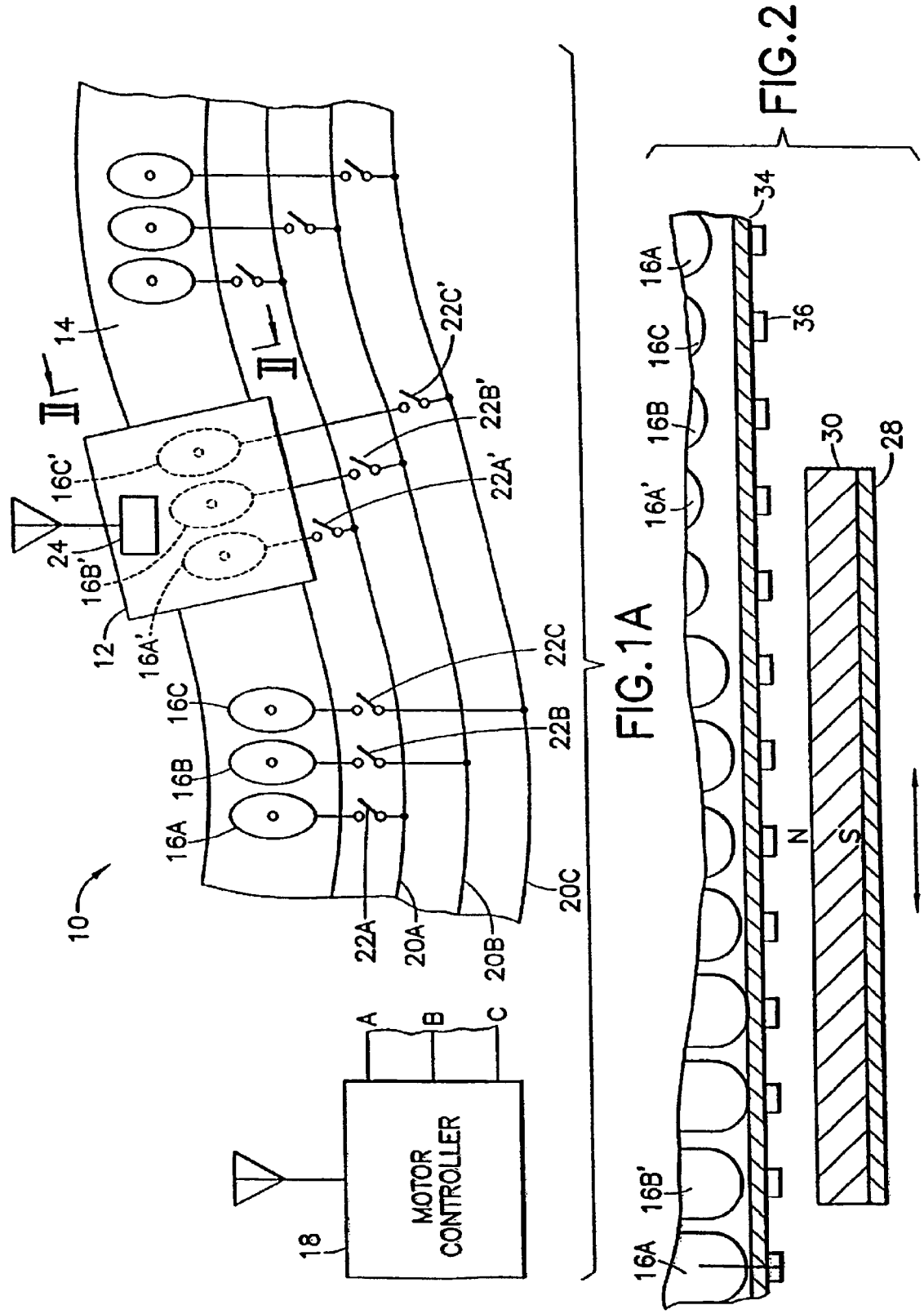

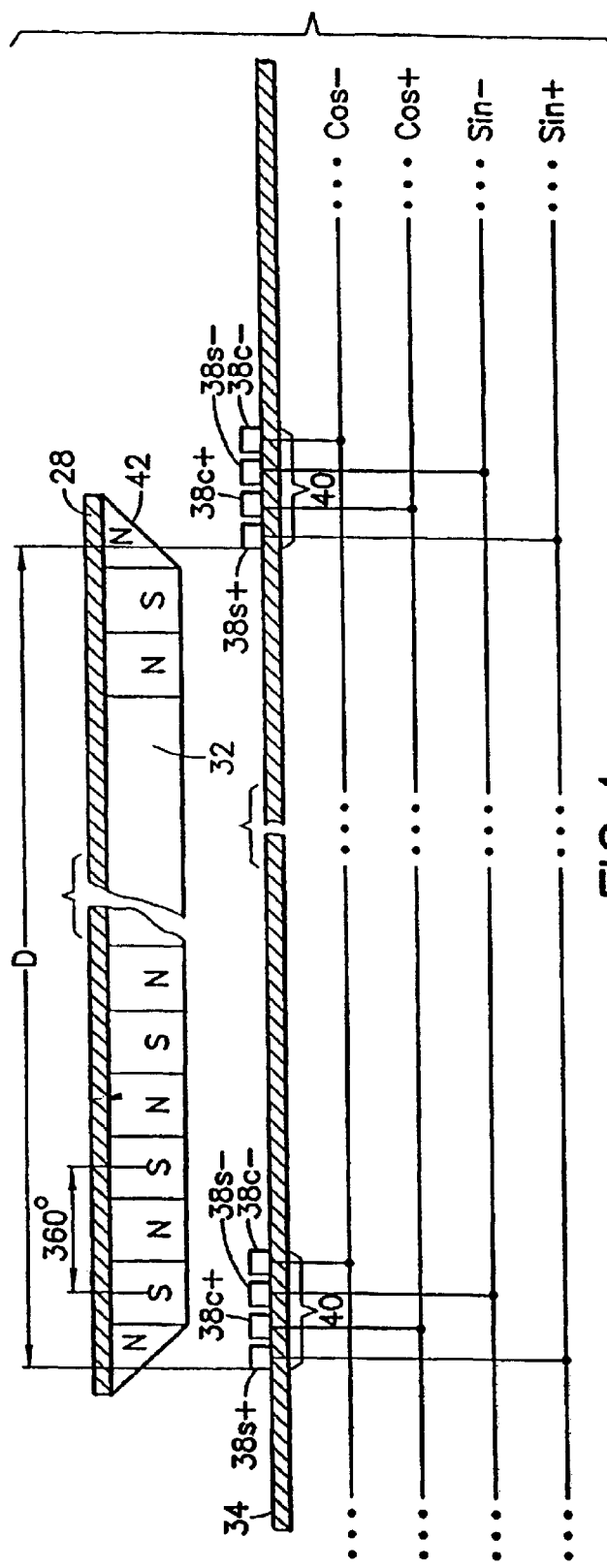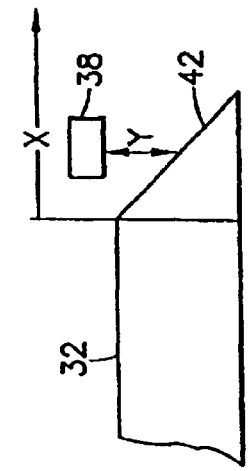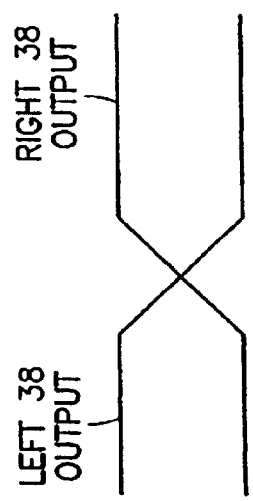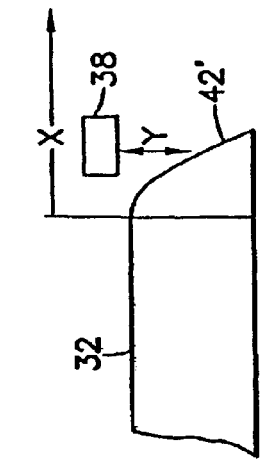
FIG.4
FIG.4C
FIG.4B
FIG.4A

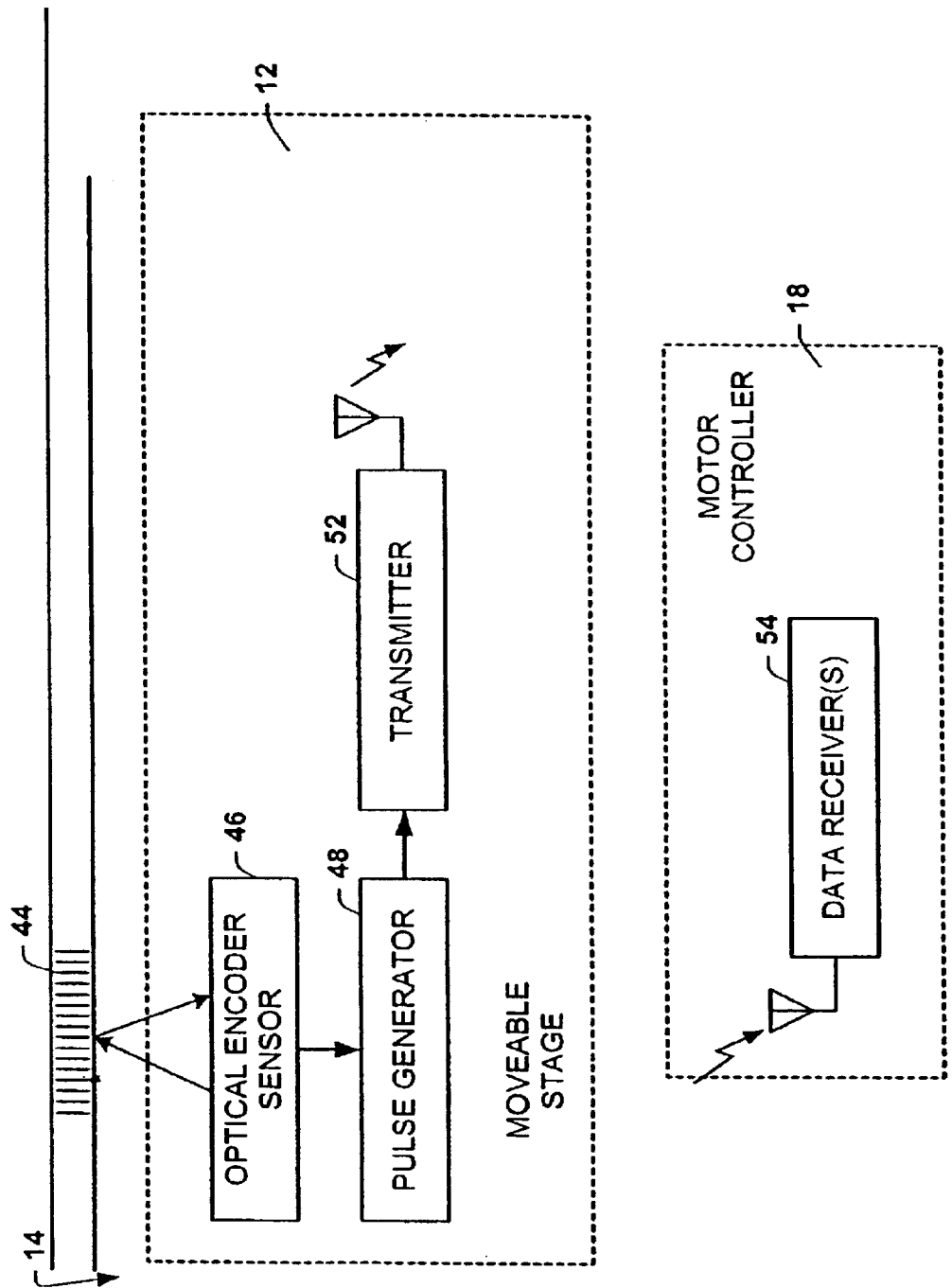

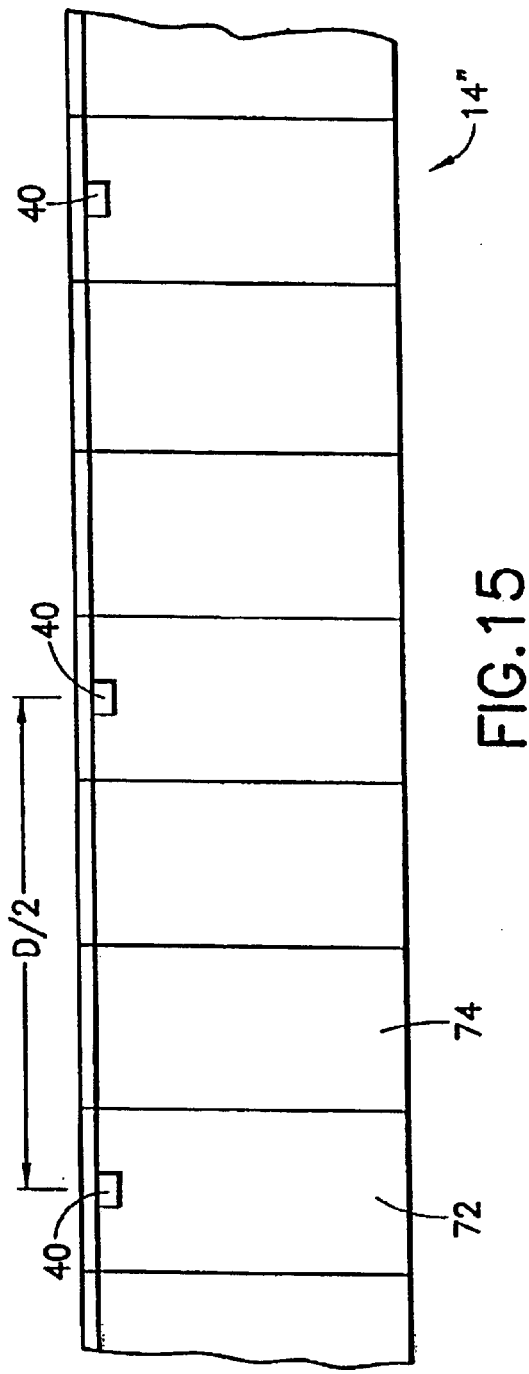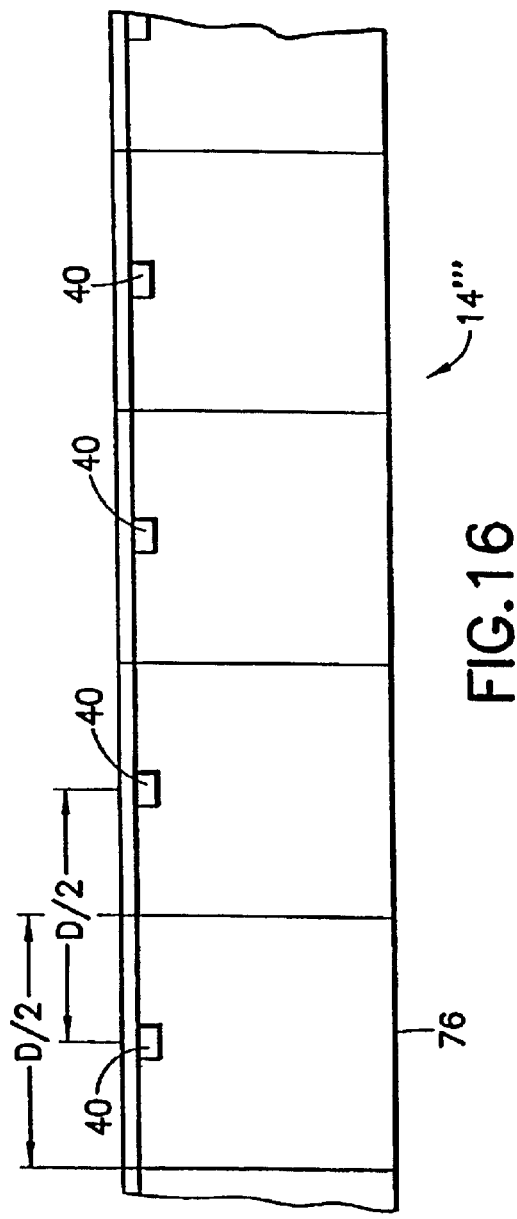

PATH MODULE FOR A LINEAR MOTOR, MODULAR LINEAR MOTOR SYSTEM AND METHOD TO CONTROL SAME

RELATED APPLICATIONS

The present application is a continuation-in-part of application Ser. No. 09/415,166 filed Oct. 8, 1999, now U.S. Pat. No. 6,274,952 entitled "CLOSED-PATH LINEAR MOTOR", which is a continuation of application Ser. No. 09/069,324 entitled "CLOSED-PATH LINEAR MOTOR" filed Apr. 29, 1998, now U.S. Pat. No. 5,994,798, which is a continuation-in-part of U.S. patent application Ser. No. 09/031,009 entitled "LINEAR MOTOR HAVING AUTOMATIC ARMATURE WINDING SWITCHING AT MINIMUM CURRENT POINTS" filed Feb. 26, 1998, now U.S. Pat. No. 5,942,817; U.S. patent application Ser. No. 09/031,287 entitled "ENCODER" filed Feb. 26, 1998, now U.S. Pat. No. 5,907,200; U.S. patent application Ser. No. 09/040,132 entitled "MODULAR WIRELESS LINEAR MOTOR" filed Mar. 17, 1998, now U.S. Pat. No. 5,925,943; and U.S. patent application Ser. No. 09/055,573 entitled "WIRELESS PERMANENT MAGNET LINEAR MOTOR WITH MAGNETICALLY CONTROLLED ARMATURE SWITCHING AND MAGNETIC ENCODER" filed Apr. 6, 1998, now U.S. Pat. No. 5,936,319.

TECHNICAL FIELD

The present invention relates to motors and, more particularly, to a module of a linear motor, a modular linear motor system and a method of controlling a module of the linear motor system.

BACKGROUND OF THE INVENTION

Linear motors having stationary armatures containing coils and movable stages containing magnets are well known in the art. Also known are linear motors having stationary magnets and moving coils.

One type of such linear motors is disclosed in U.S. Pat. No. 4,749,921. The linear motor of the referenced disclosure has a series of armature windings mounted to a base plate, and a stage having a series of magnets that is free to move on the base plate. The stage is urged in the desired direction by applying AC or DC excitation to the coils. When such a linear motor is used in a positioning system, the relationship between the location of the stage and locations of the coils is utilized to control its operation.

In one linear motor, commutator contacts are pendant from the stage. The contacts contact one or more power rails, and one or more coil contacts. As the stage moves along the armature, the location of the stage, relative to the armature is automatically accounted for by applying power to the stationary armature windings through the commutator contacts.

In other linear motors, it is conventional to employ a service loop of wires between the moving stage and the stationary elements. The location of the stage is updated using a magnetic or optical position encoder on the stage which senses markings on an encoder tape stationary alongside the path of the stage. The location is connected on the service loop to a stationary motor controller.

Generally, the important location information is the phase of the stage relative to the phase of the armature. For example, in a three-phase armature, the windings are disposed in repeating sets of three for phases A, B and C. If the center of the A phase winding is arbitrarily defined as 0 degrees, then the centers of the B and C windings are defined as 120 and 240. There may be two, three or more sets of windings as required for the travel distance of the stage. Normally, A phase windings are connected in parallel. The same is true of all B and C phase windings. Thus, when the location of the stage requires a certain voltage configuration on the particular windings within the influence of the magnets on the stage, besides powering these windings, all of the other windings in the armature are also powered. The maximum force obtainable from a linear motor is limited by the allowable temperature rise in the armature windings. When all windings are powered, whether they contribute to motor force or not, more armature heating occurs than is strictly necessary for performing the motor functions.

Some linear motors in the prior art have responded to this heating problem using switches that are closed only to the armature windings actually within the influence of the magnets.

The need for a cable loop connecting moving and stationary elements is inconvenient, and limits the flexibility with which a system can be designed. The wiring harness requires additional clearance from the linear motor to prevent entanglement between the motor and any equipment or items that may be adjacent to the linear motor path. In addition, the wiring harness adds additional weight to the moving element of the linear motor. Furthermore, manufacturing of a linear motor employing a wiring harness incurs additional cost of material and assembly labor. Therefore, it would be desirable to eliminate the use of a wiring harness in a linear motor to decrease the cost of assembly, decrease the overall weight of the moving element, and to eliminate the clearance restrictions on the linear motors utility.

Most linear motors are manufactured to follow a straight path and to be of a predetermined fixed length. This establishes the length of the armature, and consequently the number of armature windings. In such linear motors, all armature windings lie parallel to each other, with axes thereof generally 90 degrees to the travel direction of the linear motor. In order to make a new linear motor of any specific length, a new assembly typically must be tooled. Each assembly has a set number of armature windings, a set number of moveable magnets, and, a fixed length wiring harness associated with the moveable element of the linear motor. The cost of producing a linear motor is increased when each assembly is custom designed to a users needs, with new tooling required for each such design. Therefore, it is particularly desirable to produce a linear motor of a modular design.

A modular designed motor would allow easy customization for any desired length armature winding assembly. The cost of manufacturing a particular linear motor would be decreased since the cost of tooling would be minimal. A database of assembly and outline drawings will be common to all assemblies within a family of linear motors, easing assembly and manufacturing. A stocking of common parts would allow quick assembly of any special length motor assembly, from now readily available parts. The stocking of common parts also decreases overall cost of manufacturing since materials will be bought in bulk from common suppliers. The assembly of any desired length armature winding assembly will enjoy a decreased lead time. As such, a modular designed linear motor provides for a decrease in manufacturing cost, decrease in lead time to assemble, and increases overall utility.

Linear motors using a series of stationary armature windings and moving magnets require a means to dissipate heat from the coils. Linear motors having cold plates mounted on one edge of an armature winding are known in the art. Alternatively, armature windings having cooling coils or channels are also well known in the art. Examples of such armatures are disclosed in U.S. Pat. No. 4,839,545. These armatures use stacked laminated magnetic material. Linear motors having non-magnetic armatures are also known, an example of which is disclosed in U.S. Pat. No. 4,749,921. The linear motor of the referenced disclosure has a non-magnetic armature which includes a coil support structure composed of an aluminum frame or a serpentine cooling coil. In the example having an aluminum frame, heat is carried away from the coils of the armature via the aluminum frame and a side plate which functions as a heat sink. Alternatively, a serpentine coil may be employed to effect more uniform cooling within the armature. The serpentine coils support the overlapping coils while the coils and the armature are cast in a block of settable resin. However, the incorporation of such a coil has the disadvantage of increasing costs because of the complexity of assembly and material expenses. Furthermore, while the use of the settable resin prevents the occurrence of eddy currents, the thermal conductivity of the settable resin is significantly less than that of metals which it replaces and thus reduces the power dissipation capacity of the linear motor.

Linear motors are increasingly being employed in manufacturing equipment. In such equipment, nominal increases in the speed of operation translate into significant savings in the cost of production. Therefore, it is particularly desirable to produce as much force and acceleration as possible in a given linear motor. An increase in force generated requires either an increase in magnetic field intensity or an increase in current applied to coils of the armature. In a permanent magnet linear motor, the available magnetic field intensity is limited by the field strength of available motor magnets. Power dissipated in the coils increases at a rate equal the square of the current. Attendant heat generation limits the force that may be achieved without exceeding the maximum armature temperature. Therefore, improvements in the power dissipation capacity of linear motors provide for increases in their utility.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention provides a module for a linear motor system, such as may be connected together with one or more other modules to form a path. The module includes one or more armature windings spaced apart from each other. The module also includes an amplifier coupled to the windings and a controller operative to control the amplifier based on operating information received from a communications link. The amplifier controls energization of the associated windings based on the control information provided by the controller.

In accordance with one aspect, a plurality of the modules are connected together to define a path having a desired shape and length. The controller of each module receives control information from a system controller via a communications link. The system controller receives position information indicative of the position of each of one or more stages moveable along the path. The system controller determines the absolute position of each stage relative to the path and provides instructions to appropriate module controllers to energize its windings to effect desired movement of each stage.

According to another aspect, the windings of a module are non-interlaced. That is, the windings are positioned side-by-side in a non-overlapping manner. The module also has a separate amplifier associated with each of the windings. Each amplifier is operative to control energization of its associated windings so as to facilitate independent control of the windings in the module.

Another aspect of the present invention provides a method for controlling a path module in a linear motor system. The method includes receiving via a communications link control instructions from a motor controller. Control data is provided to an amplifier of the path module to selectively energize at least one armature winding of the path module based on the control instructions. According to a particular aspect, the control instructions identify one or more armature windings in the path module.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 1A is a simplified schematic diagram linear motor system in accordance with an aspect of the present invention;

FIG. 2 is a cross section taken along A—A in FIG. 1B, showing the switching magnet and switching sensors operable to control application of drive power to armature windings;

FIG. 4 is cross section taken along B—B in FIG. 1B showing the relationship between magnetic zones in an encoder magnet and encoder sensors;

FIG. 4A shows an example of a shape of a beveled magnetic zone about one of the encoder sensors from FIG. 4;

FIG. 4B shows an example of the relationship between the output of encoder sensors located at the left and right ends of encoder magnets in FIG. 4 and beveled magnet zone in FIG. 4A;

FIG. 4C shows another example of a shape of a beveled magnetic zone about one of the encoder sensors from FIG. 4;

FIG. 5 is a schematic diagram of an example of a wireless linear motor employing a wireless encoder in accordance with the present invention;

FIG. 15 is a diagram showing an example of two path modules coupled together, one module having a sensor, and another module without a sensor;

FIG. 16 is a diagram showing an alternative example of a path module having a single sensor;

DETAILED DESCRIPTION OF THE INVENTION

Figure 1B:
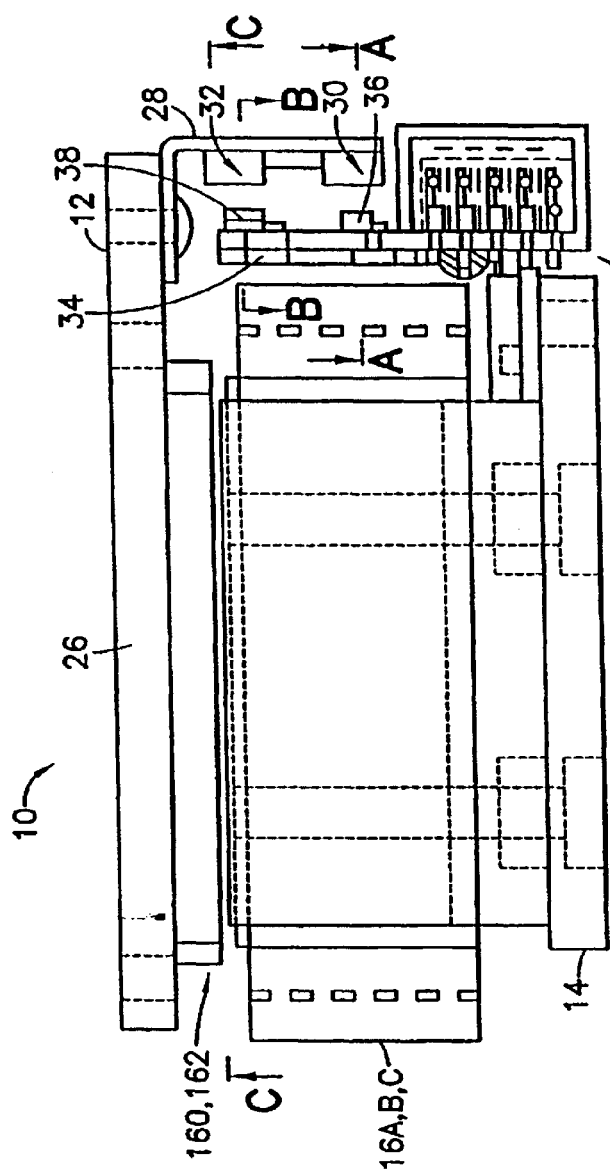
FIG. 1B is a transverse cross section taken along II—II in FIG. 1.

Referring to FIG. 1A, there is shown, generally at 10, a linear motor according to an aspect of the invention. A movable stage 12 is supported and guided in any convenient manner along a path 14. Path 14 includes therein repeating sets of three armature windings 16A, 16B and 16C for receiving, respectively, phases A, B and C of three-phase drive power produced by a motor controller 18. Phase A of the drive power from motor controller 18 is connected on a phase-A conductor 20A to terminals of normally-open phase-A switches 22A. Each phase-A switch is connected to its associated phase-A armature winding 16A. Similarly, phase-B and phase-C drive power are connected on phase-B and phase-C conductors 20B and 20C to terminals of phase-B and phase-C switches 22B and 22C, respectively. Armature windings 16A, 16B and 16C of each set may be noninterleaved. That is, they lie side by side, not overlapping as is the case in some prior art linear motors.

Switches 22A, 22B and 22C remain open, except the switches associated with the particular armature windings 16A, 16B and 16C that are within the influence of motor magnets on movable stage 12. The switches 22A, 22B and 22C that are closed in this manner are indicated as 22A', 22B' and 22C', thereby apply power to corresponding armature windings 16A', 16B' and 16C'. As moveable stage 12 moves along path 14, those of switches 22A, 22B and 22C which newly come under the influence of the magnets on movable stage 12 close, and those moving out of the influence of the magnets are opened. As described herein, the motor magnets, other separate magnets (e.g., switching magnets) or other means may be employed to effect activation of the switches 22 to a closed condition. Thus, at any time, only the armature windings 16A', 16B' and 16C' which can contribute to generating a force on movable stage 12 are powered. The remainder of armature windings 16A, 16B and 16C, not being useful for contributing to the generation of force, remain in a quiescent, unpowered, condition. This contributes to a reduction in power consumption, and a corresponding reduction in heating compared to prior-art devices in which all armature windings are powered, regardless of whether they are position to contribute to force.

In an application where "open-loop" drive of movable stage 12 is satisfactory, motor controller 18 produces the required sequence of phases to drive stage 12 in the desired direction. However, one desirable application is a "closed-loop" drive system in which motor controller 18 receives feedback information from movable stage 12 indicating either its position along path 14, or increments of motion along path 14. A closed-loop system permits accurate control of position, velocity and acceleration of movable stage 12.

The prior art satisfies the requirement for position feedback using wiring between movable stage 12 and motor controller 18. This is inconvenient in some applications, and impractical in others. Impractical applications including travel of movable stage 12 along a path 14 which is closed upon itself or be a curved path. An example of a closed path is an oval or "race-track" pattern of value in a robotic assembly operation, to be described in greater detail later in this specification. That is, movable stage 12 continues in a forward direction repeatedly traveling in the same direction on path 14. Wiring between the movable and stationary elements for such an application is either difficult or impossible to accomplish. An effective mechanism that may be implemented in a motor in accordance with an aspect of the present invention to significantly reduce the amount of wiring is described below.

The example shown FIG. 1A includes a communications device 24 which wirelessly informs motor controller 18 about the position and/or incremental motion of movable stage 12. Communications device 24 is a linear encoder which does not require connecting cables between stationary and movable elements, as will be explained.

By way of example, at least some of the position or motion information is developed at stationary locations off movable stage 12, without requiring the transmission of position information.

It can be seen from the simplified drawing of FIG. 1A, and the description above, that linear motor 10 requires the following actions:

(1) control of switches 22A, 22B, 22C
(2) feedback of position or motion data; and
(3) drive power generation related to position (or motion-derived position).

Referring to FIG. 1B, a cross section taken along II—II through path 14 of FIG. 1A, looking at the end of movable stage 12 reveals a plurality of motor magnets 160, 162 below a plate 26. Lower surfaces of motor magnets 160, 162 are maintained closely parallel to an upper surface of armature windings 16A, 16B and 16C. By way of example, armature windings 16A, B, C, may be wound on stacked laminations of magnetic metal. In this case, the lower surface of motor magnets 160, 162 are maintained closely parallel to an upper surface of the stacked laminations. Some applications may benefit from the reduction in static load on movable stage 12 provided when armature windings 16A, 16B and 16C contain no magnetic material. For purposes of later description, motor magnets 160, 162 are referred to as motor magnets. Armature windings 16A, B and C are energized as necessary to interact with motor magnets 160, 162 whereby a translational force is generated on movable stage 12 so as to move the stage relative to the path 14.

In accordance with on aspect, a pendant arm 28 extends downward from plate 26. Pendant arm 28 has attached thereto a switching magnet 30 and an encoder magnet 32, both movable with movable stage 12. A rail 34, affixed to path 14, rises generally parallel to pendant arm 28. Rail 34 has affixed thereto a plurality of longitudinally spaced-apart switching sensors 36 facing switching magnet 30, and a plurality of longitudinally spaced-apart encoder sensors 38 facing encoder magnet 32.

Referring now to FIG. 2, switching sensors 36 are evenly spaced along rail 34. Each switching sensor 36 is positioned on rail 34 aligned with its respective armature winding 16. For example, switching sensors 36 are Hall-effect devices. Switching magnet 30 has a length in the direction of travel roughly equal to the length of travel influenced by the magnetic fields of motor magnets 160, 162. This length is variable in dependence on the number of motor magnets used. By way of further example, the length of switching magnet 30 is sufficient to influence nine switching sensors 36. That is, in FIG. 2, nine armature windings 16 (three sets of phases A, B and C) are connected at any time to their respective power conductors 20 for magnetic interaction with motor magnets 160, 162.

Switching sensors 36 control the open and closed condition of respective switches, as previously explained. Any convenient type of switch may be used. According to one aspect, the switches are conventional semiconductor switches such as thyristors or power MOSFET transistors. Since semiconductor switches, and the technique for controlling their open/closed condition are well known to those skilled in the art, a detailed description thereof is omitted.

Figure 3:
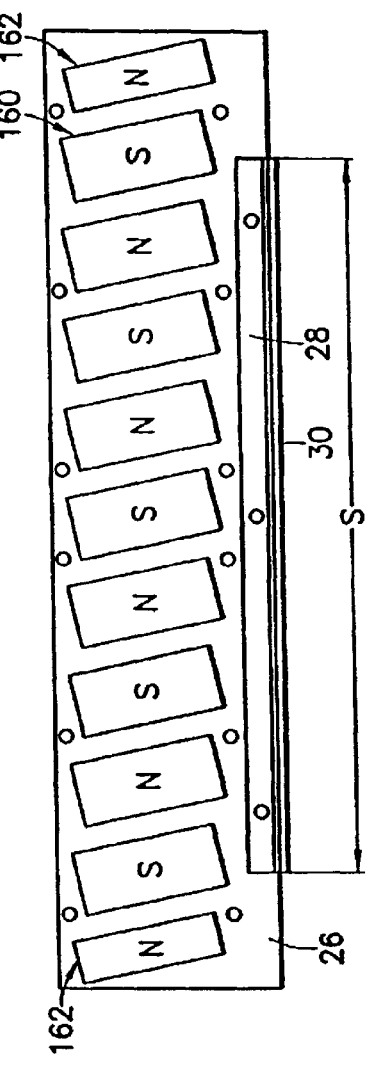
FIG. 3 is a cross section taken along C—C in FIG. 1B, showing the relationship between the switching magnet and motor magnets.

FIG. 3 is a cross section taken along C—C in FIG. 1B to illustrate the underside of plate 26. By way of example, the plate 26 includes nine motor magnets 160 equally spaced therealong. In addition, an additional motor magnet 162 is disposed at each end of the array of nine motor magnets 160. Motor magnets 160, 162 are tilted as shown in a conventional fashion to reduce cogging. It will be noted that the length of switching magnet 30 is approximately equal to the center-to-center spacing of the end ones of the set of nine full motor magnets 160. This length of switching magnet 30 defines the span S of the active portion of linear motor 10 (FIG. 1B). That is, only those of armature windings 16 that lie within the span S receive power. As armature windings 16 enter the span S, such that the magnetic influence of switching magnet 30 is sensed by the sensors 36. As a result, the switches 22 are activated to a closed condition, thereby causing the windings 16 to receive power. Power is cut off from the windings 16 as they exit the span S.

Additional motor magnets 162, being outside the span, do not contribute to the generation of force because armature windings 16 below them are unpowered. However, additional motor magnets 162 perform an important function. It is important to the function of linear motor 10 that the magnetic field strength along plate 26 be generally sinusoidal. In the absence of additional motor magnets 162, the magnetic fields produced by the two motor magnets 160 at the ends of span S depart substantially from sinusoidal due to fringing effects. This produces ripple in the force output. The presence of additional motor magnets 162, by maintaining substantially sinusoidal magnetic field variations along motor magnets 160, avoids this source of ripple.

Additional motor magnets 162 are shown with widths that are less than that of motor magnets 160. It has been found that a narrower width in additional motor magnets 162 produces satisfactory results. However, it has also been found that a wider additional motor magnet 162 does not interfere with the function. From the standpoint of manufacturing economy, it may be desirable to employ only a single size magnet for both motor magnets 160 and additional motor magnets 162, thereby reducing stocking costs, and assembly costs.

Figure 3A:
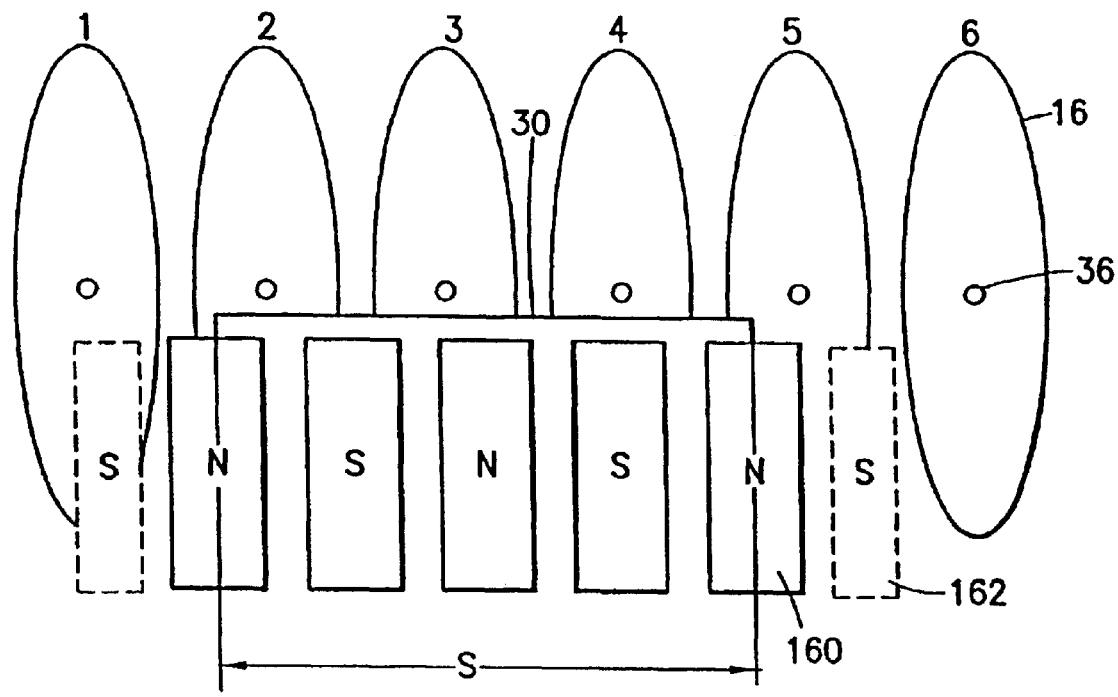
FIG. 3A is a cross section taken along C—C in FIG. 1B, showing the positional relationship between the switching magnets and the motor magnets.
Figure 3B:
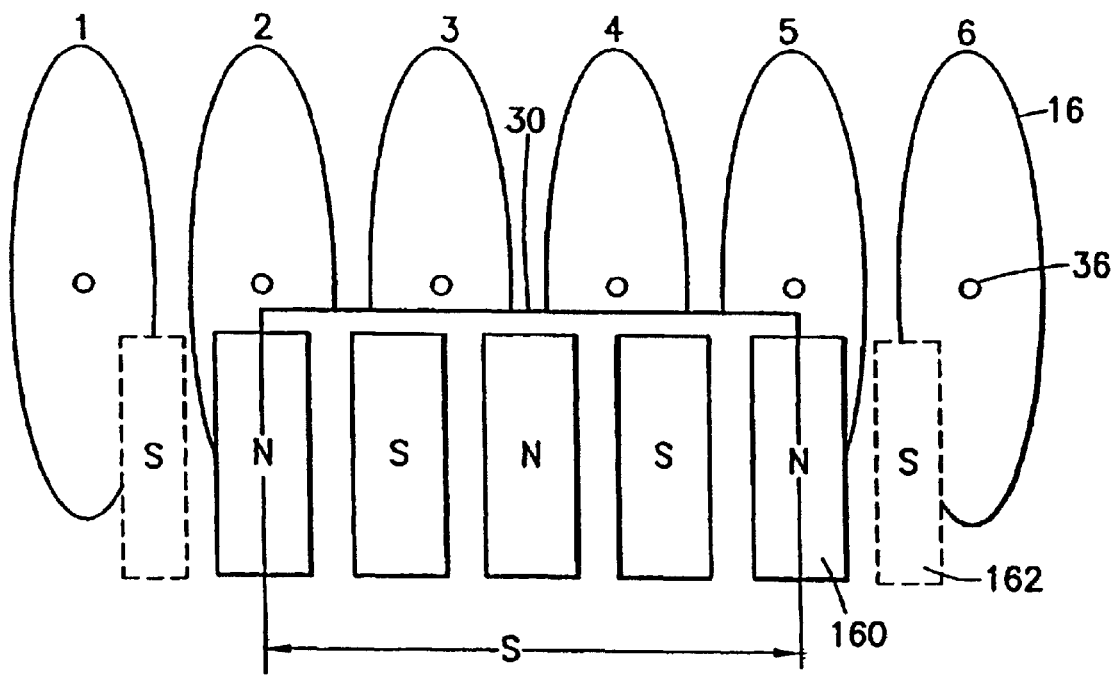
FIG. 3B is a cross section taken along C—C as in FIG. 3A, where the movable stage has moved to the right from its position in FIG. 3A.

FIGS. 3A and 3B illustrate different positional relationships between switching magnet 30 and motor magnets 160, 162. Referring now to FIG. 3A, for purposes of explanation, a reduced set of five motor magnets interacts with four armature windings. As movable stage 12 moves, switching magnet 30 and motor magnets 160, 162 move together with the stage, maintaining the same relative positions. As movable stage 12 moves along, those switching sensors 36 adjacent switching magnet 30 turn on their respective switches (e.g., to a closed condition). Switching sensors 36 that are not adjacent switching magnet 30 maintain their respective switches turned off (e.g., to an open condition). In the condition shown, switching sensors 36 centered on armature windings 16-2, 16-3, and 16-4 are adjacent switching magnet 30, and these armature windings are connected to drive power. The switching sensors 36 centered on armature windings 16-1. 16-5 and 16-6 are not adjacent switching magnet 30, and therefore, these switching sensors 36 maintain armature windings 16-1, 16-5 and 16-6 cut off from drive power. The centers of motor magnets 160 shown are offset from the centers of the armature windings 16 most closely adjacent. Therefore turned-on armature windings 16 produce force by the interaction of their magnetic fields with the magnetic fields of the three nearest motor magnets 160.

Referring now to FIG. 3B, movable stage 12 has moved to the right from its position in FIG. 3A until the center of the right-hand motor magnet 160 is centered over the center of armature winding 16-5. In this relationship, the end of switching magnet 30 just reaches a position adjacent switching sensor 36. This is a minimum-current position. Thus, at this instant, switching sensor 36 closes its switch to connect armature winding 16-5 to its power source. In this center-overlapped condition, armature winding 16-5 is incapable of generating a force relative to the centered magnet 160. Thus, the current in armature winding 16-5 is at a minimum, and the switching takes place at minimum current to armature winding 16-5. Similarly, at about this same instant, the left-hand end of switching magnet 30 passes off the switching sensor 36 aligned with armature winding 16-2, thereby cutting off power to armature winding 16-2. The center of left-hand motor magnet 160 is aligned with the center of armature winding 16-2 at this time. Thus, the current to armature winding 16-2 is minimum at this time. The above switching at minimum current reduces electrical switching noise which would be generated if switching were to take place at times when an energized armature winding 16 is generating force, or a deenergized armature winding 16 would generate a force immediately upon energization.

For a three-phase drive system, a minimum of five motor magnets is required to interact at any time with a minimum of four armature windings, or vice versa. If additional force is desired, magnets can be added in increments of four. That is, the number of magnets=5+4L where L is an integer, including zero. The number of armature windings in span S=(number of motor magnets in span S)−1. Thus, the examples shown in FIGS. 2 and 3 employ 5+(4*1)=9 magnets. The positioning of the magnets is such that the center-to-center spacing of the extreme ends of the 9 magnets is equal to the center-to-center spacing of 8 armature windings.

FIG. 4 illustrates a magnetic encoder system in accordance with an aspect of the present invention. The encoder magnet 32 includes alternating magnetic zones alternating with north and south polarities facing encoder sensors 38. Accordingly, each encoder sensor 38 is exposed to alternating positive and negative magnetic fields as encoder magnet 32 passes it. The zones at the extreme ends of encoder magnet 32 are beveled magnetic zones 42. Beveled magnetic zones 42 produce an increasing or decreasing magnetic field as it moves onto or off an encoder sensor 38. Beveled magnetic zones 42 are illustrated as linear ramps. Motors using such linear ramps have been built and tested successfully. However, a shape other than a linear ramp may give improved results. It is known that the magnetic field of a motor magnet decreases as the square of the distance from the magnet. Thus, to have an increase in magnetic field at one beveled zone that is substantially equal to the decrease in the magnetic field at the opposite magnetic zone, the bevel shape may be described by a squared law.

Referring momentarily to FIG. 4A, a shape of beveled magnetic zone which satisfies the rule that, for equal increments of motion of beveled magnetic zone 42', there are equal changes in magnetic field at encoder sensor 38 is represented by the equation:

$$y=a+bx^2$$

where:

y is the distance from the surface of the magnet to encoder sensor 38, x is the position along beveled magnetic zone 42', and a and b are constants.

Experience dictates that other factors besides the square law above affects the relationship between magnetic field and distance. The shape of beveled magnetic zones 42' may require modification from the square law to account for such other factors.

Referring now to FIG. 4B, when the ideal shape of beveled magnetic zones 42' is attained, the outputs of the encoder sensors at the left and right ends of encoder magnet 32 should approximate the figure. That is, the sum of the signal from the left beveled magnetic zone 42', and the signal from the right beveled magnetic zone 42' should remain about constant.

Returning back to FIG. 4, each encoder sensor 38, for example, is a Hall-effect device. A Hall-effect device produces a current when exposed to one magnetic polarity (north or south) but is insensitive to the opposite magnetic polarity. Encoder sensors 38 are disposed into encoder sensor groups 40 consisting of four encoder sensors 38 spaced in the direction of travel. Each encoder sensor group 40 is spaced from its neighboring encoder sensor group by a distance D. Distance D is seen to be equal to the center-to-center distance between the beveled magnetic zones 42 at the ends of encoder magnet 32. The four encoder sensors 38 in each encoder sensor group 40 are spaced in the direction of travel of movable stage 12 in relation to the center-to-center distance between magnetic zones in encoder magnet 32. For purposes of description, the center-to-center distance between magnetic zones of like polarity is considered to be 360°. Thus, the center-to-center distance between adjacent magnetic zones is considered to be 180°, and the distance between the center of a zone and its edge is considered to be 90°.

It is conventional for encoders to produce a sine and a cosine signal, relatively 90° out of phase, for use in detecting the direction of incremental motion of a stage. With magnetically actuated Hall-effect devices, this conventional technique presents a problem in that a Hall effect device responds only to one magnetic polarity (north or south) and is insensitive to the opposite polarity. To solve this problem, each encoder sensor group 40 includes one encoder sensor 38s+ for producing a sine+output, and a second encoder sensor 38s− for producing a sine− output. Encoder sensor 38s− in encoder sensor group 40 is spaced 180° in the direction of travel from its companion encoder sensor 38s+. When the sine+ and sine− signals are added in motor controller 18, the desired sinusoidal sine signal is available. A cosine+ encoder sensor 38c+ is spaced 90 in the direction of travel from sine+ encoder sensor 38s+. A cosine−encoder sensor 38c− is spaced 180 in the direction of travel from its companion cosine+ encoder sensor 38c+. When the cosine+ and cosine− signals are added in motor controller 18, the desired cosine signal is generated.

The spacing D between encoder sensor groups 40 is such that, as a particular encoder sensor 38 in one encoder sensor group 40 is aligned with beveled magnetic zone 42 at one end of encoder magnet 32, its counterpart is aligned with beveled magnetic zone 42 at the opposite end of encoder magnet 32. As illustrated, for example, when sine+ encoder sensor 38s+ in the left-hand encoder sensor group 40 is aligned with the center of the left-hand beveled magnetic zone 42, its counterpart sine+ encoder sensor 38s+ is aligned with the right-hand beveled magnetic zone 42 at right end of encoder magnet 32.

Corresponding encoder sensors 38 are connected in parallel to a line connected to motor controller 18. Four separate lines are illustrated to carry the ±sine/cosine signals. As movable stage 12 moves along, the encoder sensor 38 coming into alignment with beveled magnetic zone 42 at one end of encoder magnet 32 produces an increasing signal while the encoder sensor 38 moving out of alignment with beveled magnetic zone 42 at that end produces a decreasing signal. Since the corresponding encoder sensor signals are added, the signal transition, as one encoder sensor group 40 becomes active, and its neighbor encoder sensor group 40 becomes inactive is smooth, without a discontinuity that would interfere with detecting motion. One skilled in the art will understand that the above spacing can be increased by 360° between any ± pair of encoder sensors 38 without affecting the resulting output signal. Also, in some applications, since the outputs of sine encoder sensors are, in theory, 180° out of phase with each other, both sine encoder outputs could be applied to a single conductor for connection to motor controller 18. In other applications, four separate conductors, as illustrated, may be desired.

In accordance with an aspect of the linear motor 10, a third encoder sensor group 40 (not shown) is disposed midway between the illustrated encoder sensor groups 40. This has the advantage that, during the transition of beveled magnetic zones 42 at the ends of encoder magnet 32 from one encoder sensor group 40 to the next encoder sensor group 40, resulting departures of the encoder signal due to tolerances in the lengths of encoder magnet 32, and the precise spacing of encoder sensor groups 40 is at least partially swamped out by the signal generated by an encoder sensor group 40 located midway between the ends of encoder magnet 32.

Referring again to FIG. 1A, it will be recognized that the functions of communications device 24 are satisfied by the above-described wireless magnetic system for communicating the motion of movable stage 12 to motor controller, without requiring any active devices on movable stage 12. One limitation on such a system is the difficulty in producing closely spaced alternating magnetic zones in encoder magnet 32. Thus, the positional resolution of such a system may be relatively crude.

Referring now to FIG. 5, one solution to the resolution problem includes a conventional encoder tape 44 in a fixed location along path 14, and a conventional optical encoder sensor 46 on movable stage 12. Encoder tape 44, for example, is ruled with fine parallel lines. Optical encoder sensor 46 focuses one or more beams of light on encoder tape 44, and detects the changes in light reflected therefrom as lines and non-lines pass in front of it. Generally, optical encoder sensor 46 produces sine and cosine signals for determining relative motion between stage 12 and path 14. Since, in the example shown in FIG. 5, the parallel lines on encoder tape 44 are closely spaced, very fine resolution is possible.

As an alternative, the encoder tape 44 may include a gradient gray-scale or color scale that varies along the path length, with the encoder sensor 46 being sensitive to the changes in wavelength and/or frequency in the light reflected from the tape 44. By way of further illustration, alternating reflective and non-reflective elements may be positioned along the path for interaction with the beam of light from the encoder sensor 46. Those skilled in the art will understand and appreciate other optical, magnetic, inductive, and/or capacitive means that could be utilized to obtain a suitable indication of position and/or movement of the stage 12 relative to the path 14 in accordance with an aspect of the present invention.

According to on aspect, the sine and cosine outputs of optical encoder sensor 46 are applied to a pulse generator 48 that provides a pulsed signal responsive to the output signal from the encoder sensor. The output of pulse generator 48 is applied to a transmitter 52. Transmitter 52 transmits the pulse data as a wireless signal to a data receiver 54 located in motor controller 18. Motor controller 18 thus may be programmed and/or configured to control energization of the motor windings 16 based on the position information received from the encoder system. The wireless encoder system can be used in addition to a less precise magnetic encoder system, such the magnetic encoder shown in FIG. 4, in order to obtain enhanced position resolution. Alternatively, the magnetic encoder may be omitted and the wireless encoder system may be the only position sensing device for the stage. However, those skilled in the art will understand and appreciate other position and/or movement sensing devices that could be used in conjunction with the wireless encoder in accordance with an aspect of the present invention.

In the example of shown and described with respect to FIG. 5 the transmitter 52 may be continuously active. Because the system is wireless, the illustrated apparatus on movable stage 12 is battery operated. Consequently, full-time operation of transmitter 52 may reduce battery life. Additionally, while the system is shown with antennas, implying that transmission and reception use radio frequency, it is to be appreciated that any type of wireless communication system may be used. This includes, for example, radio, optical (e.g., infrared), ultrasonic, and any other technique capable of transmitting the information, without requiring connecting wires, from movable stage 12 to motor controller 18.

By way of further example, transmitter 52 and data receiver 54 may be implemented as transceivers that implement a Bluetooth standard protocol for short range wireless communication of data (see, e.g., the Website www.bluetooth.com). Advantageously, Bluetooth operates in the 2,400–2,483.5 MHz industrial, scientific and medical (ISM) band, which is available worldwide and allows unlicensed operation of spread spectrum systems. The wireless units are arranged to define a piconet, which is a collections of devices that can be connected via Bluetooth technology in an ad hoc fashion. Each Bluetooth device (e.g., transmitter-receiver pair on the stage and motor controller) is a peer unit and have substantially similar implementations. However, when establishing a piconet, one unit (e.g., at the motor controller) acts as a master for synchronization purposes and the other as a slave for the duration of the piconet connection. A master unit is a device in a piconet whose clock and hopping sequence are used to synchronize all other devices in the piconet. Each device in a piconet that is not the master is a slave.

Figure 5A:
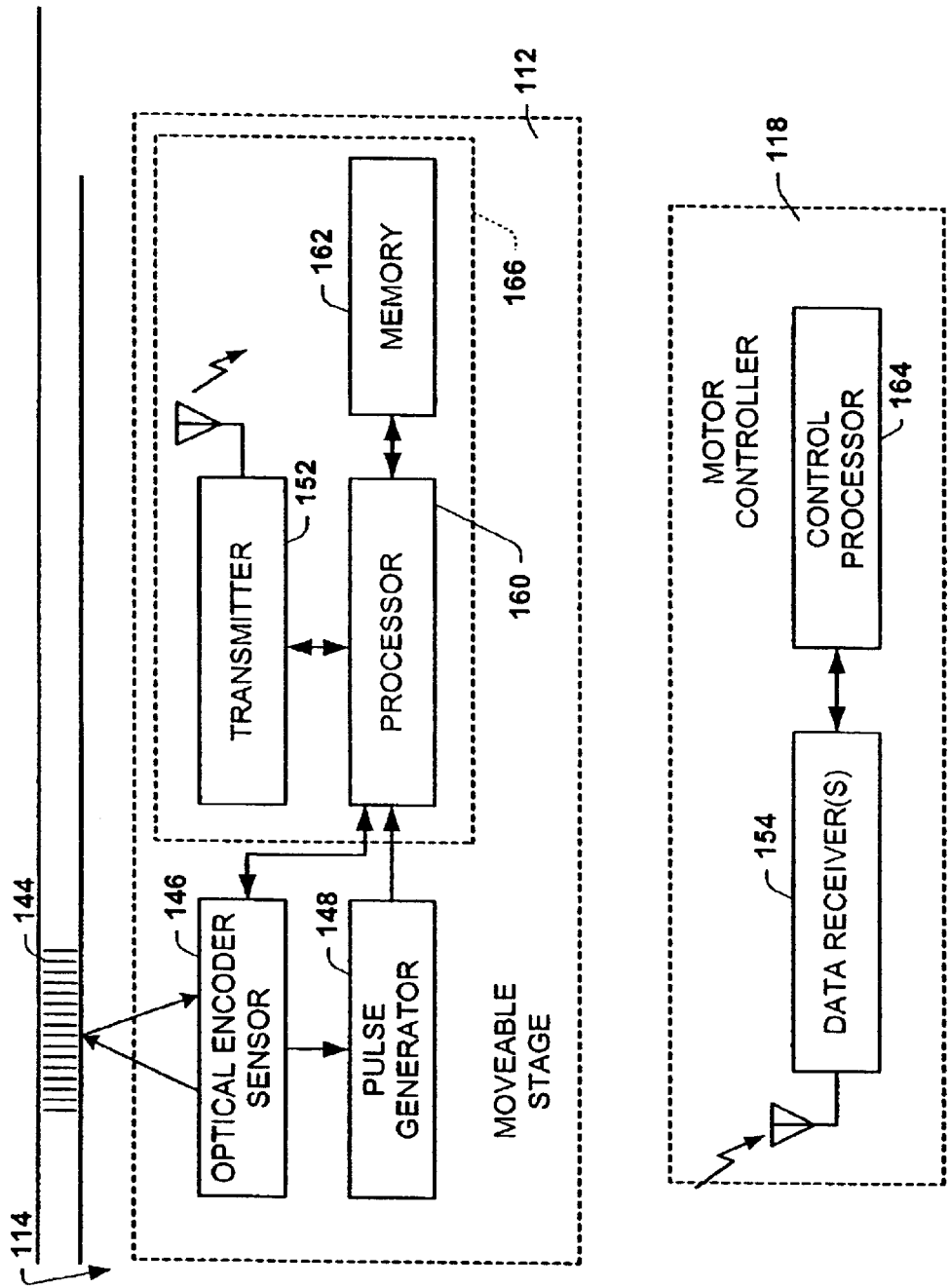
FIG. 5A is a schematic diagram of another example of a wireless linear motor employing a wireless encoder in accordance with the present invention.

FIG. 5A illustrates another example of a linear motor system employing a wireless encoder system in accordance with another aspect of the present invention, in which like reference numerals, increased by adding 100 refer to similar items as identified with respect to FIG. 5. Briefly stated, the encoder system of FIG. 5A includes an optical encoder sensor 146 that provides a beam of light onto indicia (e.g., ruled parallel markings 144) arranged along the path 114. The encoder sensor 146 provides an encoder output signal to a pulse generator 148.

The pulse generator 148 is coupled to a processor 160, which receives a pulse output signal from the pulse generator indicative of the markings detected by the encoder sensor 146. The processor 160 is coupled to memory 162, which stores program data useful in collecting the position data and/or controlling operation of components located on the stage 112. For example, the processor 160 may be coupled to the encoder sensor 146 for controlling operation the sensor as well as controlling the transmitter 152.

In accordance with an aspect of the present invention, the processor 160 also is coupled to the transmitter 152 to control the wireless output of data from the stage 112 to the associated motor controller 118. In particular, the transmitter 152 is configured to transmit a data signal according to an established communications protocol for receipt by a data receiver 154 at the motor controller 118. The processor 160, for example, may provide an enhanced data signal to the transmitter 152, which the transmitter modulates and transmits to the remote data receiver 154. The enhanced data may contain information identifying the stage 112 (e.g., a unique address) and/or other information that may be useful in controlling movement of the stage relative to the path 114. This is particularly useful when multiple moveable stages are implemented on a single path or when a single motor controller may be programmed to control one or more stages on multiple paths.

The data receiver 154 is further coupled to a control processor 164, such as may be able to process the received data signal and determine an indication of the position and/or velocity of the stage 112 relative to the path 114. The motor controller 118 thus may employ the position information to control energization of selected motor windings so as to move the stage in a desired manner along the path, such as shown and described herein.

It will be understood and appreciated by those skilled in the art that some or all of the processing of the position data may be performed at the stage 112 by the processor 160, such as according to the executable instructions stored in the memory 162. It further will be understood and appreciated that, for example, the transmitter 152, processor 160, and memory 162 may be implemented as an Application Specific Integrated Circuit (ASIC) 166 programmed and/or configured to perform desired control and data transmission functions in accordance with an aspect of the present invention. Additionally, the various aspects of the wireless encoder system of FIG. 5A could be implemented as digital circuitry, analog circuitry or a combination thereof.

Figure 6:
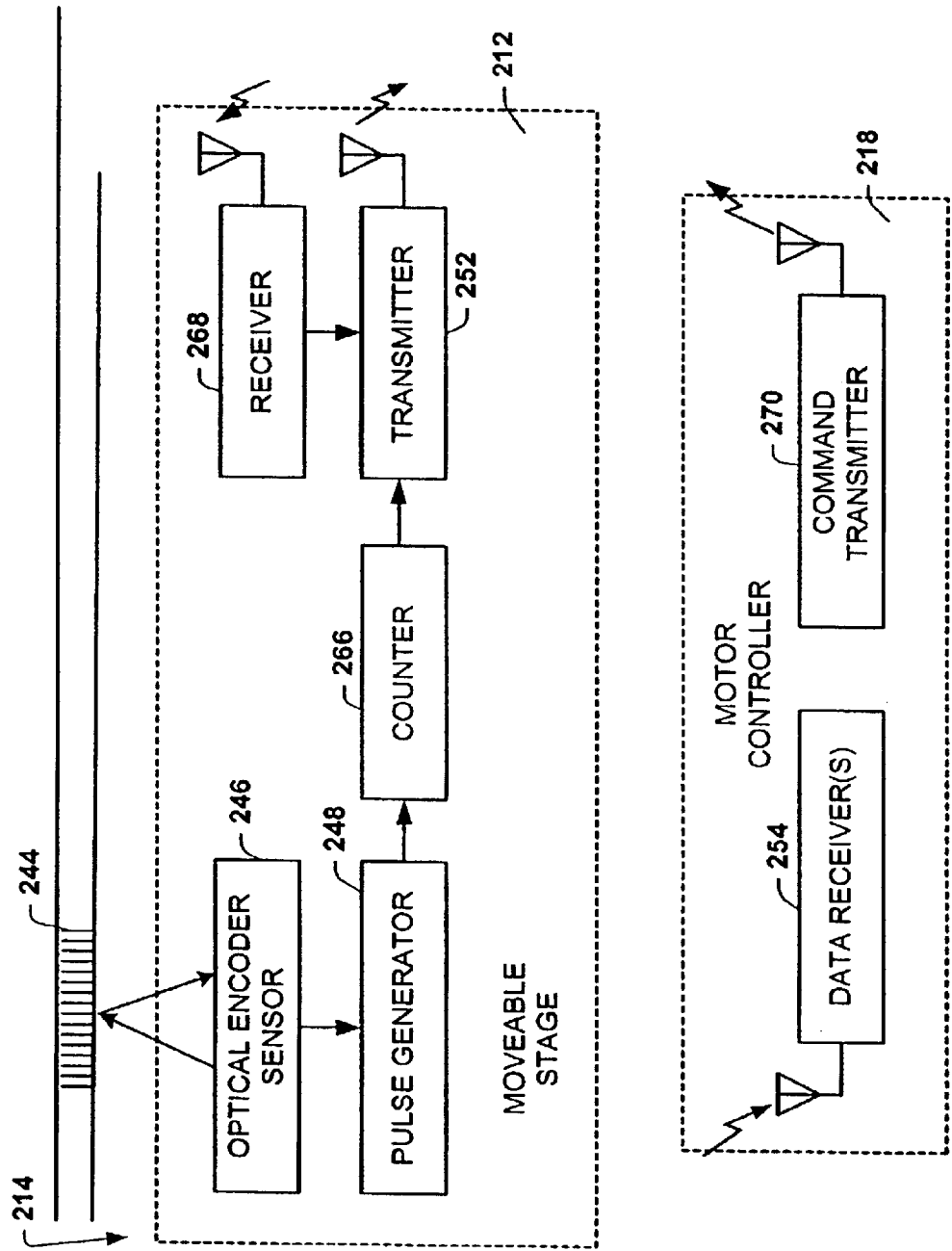
FIG. 6 is a schematic diagram of another example of a wireless linear motor employing a wireless encoder in accordance with the present invention.
Figure 6A:
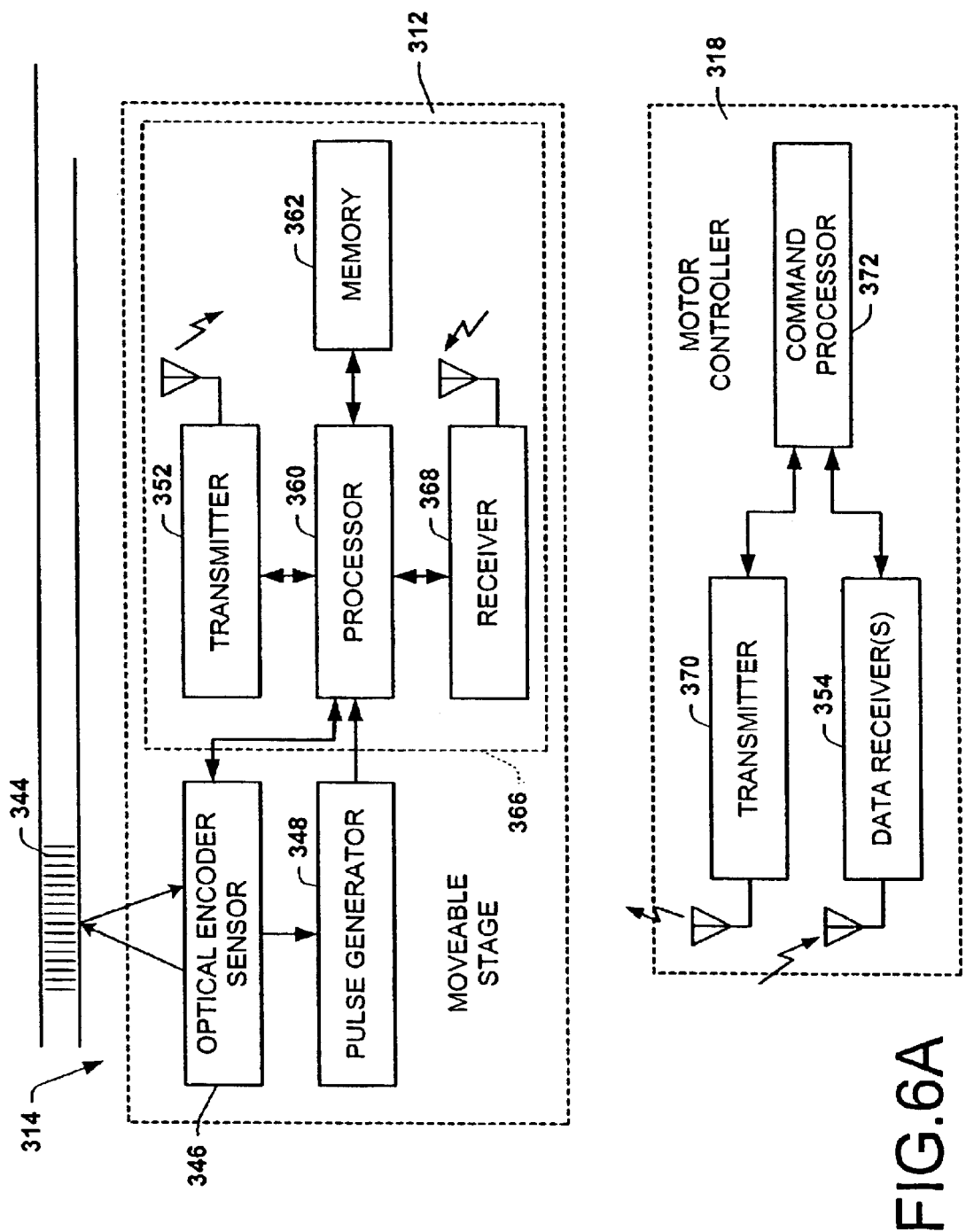
FIG. 6A is a schematic diagram of another example of a wireless linear motor employing a wireless encoder in accordance with the present invention.

FIGS. 6 and 6A illustrate other examples of a wireless encoder system, in which one or more components associated with the stage are responsive to control information received from the motor controller in accordance with aspect of the present invention.

In FIG. 6, reference numbers have been increased, by adding 200, to refer to corresponding previously identified with respect to FIG. 5. Briefly stated, the wireless encoder system includes a stage 212 having an optical encoder sensor 246 coupled to a pulse generator 248 for providing a signal indicative of movement sensed, for example by light reflected from an adjacent encoder tape 244. The pulse generator 248 is coupled to a counter 266 that stores a count value based on the pulse signal received from the pulse generator. The counter 266 is coupled to a transmitter 252 that is operative to transmit a signal through an associated antenna for receipt by a data receiver 254 at the motor controller 218.

In accordance with an aspect of the present invention, the stage 212 also includes a receiver 268 coupled to the transmitter 252. The receiver 268 receives a signal from a command transmitter 270 located in the motor controller 218 via an established communications protocol. The receiver 268 controls operation of the transmitter 252 based on the signal from the command transmitter 270. For example, the transmitter 252 may remain off (e.g. inactive) until commanded to transmit by receiver 268. Upon activation, the transmitter 252 transmits a signal indicative of the count value stored in counter 266. Although this mode of operation may require that receiver 268 remain active, the power drain of a solid state receiver is generally lower than that of a transmitter.

By way of particular example, the receiver 268 may include a tag circuit, such as a closed loop circuit including an inductor and a capacitor, defining an L-C tank circuit, and an integrated circuit (not shown). The command signal is received at a remote antenna of the receiver 268, which may be a patch antenna, a coil antenna or any other structure for receiving the command signal. A tag circuit is advantageous in that it extracts energy from the transmitter signals received at its antenna. The command transmitter 270 thus may repeatedly transmit a pulsed command signal at predetermined time intervals, suitably in a broadcast fashion, at a specified rate, or based on the position information derived from the count value transmitted to the data receiver 254. It further will be appreciated that such a tag circuit could be implemented as part of the transmitter 252, such that power requirements may be further reduced. While the tag circuit is capable of using the power associated with the signal received from the command transmitter 270 to effect activation of the transmitter 252, it will be understood by those skilled in the art that, additionally or alternatively, such circuitry on the stage may include a battery or other energy storage device to facilitate operation thereof.

Alternatively, the receiver 268 may provide a command count value that is stored in the transmitter 252. The transmitter 252 may, in turn, compare the counter value from the counter 266 with the stored command count value and control transmission based on the value of the counter value relative to the command count value. The command transmitter 270 thus may provide the signal periodically, based on sensed parameters, and/or based on the detected position of the stage relative to the path 214.

As in prior examples, any wireless communication protocol may be used in receiver 58 and command transmitter 56. As described with respect to FIGS. 5 and 5A, for example, and amplitude and/or frequency modulation technique may be utilized, including, in particular, a Bluetooth communications protocol.

FIG. 6A illustrates another example of a linear motor system implementing a wireless encoder system in accordance with an aspect of the present invention, in which like reference numerals, increased by adding 300, refer to similar parts shown and described with respect to FIG. 5. The encoder system of FIG. 6A includes an optical encoder sensor 346 that provides a beam of light onto indicia (e.g., ruled parallel markings on encoder tape 344) arranged along the path 314. The encoder sensor 346 receives reflected light from the tape 344 and provides an encoder output signal to a pulse generator 348.

The pulse generator 348 is coupled to a processor 360, which receives a pulse output signal from the pulse generator indicative of movement between of stage 312 relative to the path 314 as detected by the encoder sensor 346. The processor 360 is coupled to memory 362, which stores program instructions and/or data useful in collecting the motor position data and controlling operation of the encoder system located on the stage 312.

In accordance with an aspect of the present invention, the processor 360 is coupled to a transmitter 352, which transmits a wireless transmitter signal for receipt by a data receiver 354 at the motor controller 318. The processor 360 also coupled to a receiver 368, which is operative to receive control information from a transmitter 370 of the motor controller 318. That is, the system of FIG. 6A provides for bi-directional wireless communication between the encoder module associated with the stage and the motor controller.

While the transmitter and receiver 352 and 360 are illustrated as being separate, it is to be appreciated that such components could be implemented as an integral transceiver. By way of further illustration, the transmitter 352, processor 360, receiver 360, and memory 362 could be implemented as an ASIC 366 programmed and/or configured to control wireless communication relative to the stage 312 as well as control operation of the optical encoder sensor 346.

In accordance with one particular aspect, the encoder system at the stage 312 is programmable. For example, the command processor 372 at the motor controller 318 may cause the transmitter 370 to transmit program instructions to the stage 312, such as control parameters based on which the processor 360 may control the transmitter and/or encoder sensor 346. As mentioned above, in a multi-stage system, each transmission may be uniquely addressed to one or more recipient stages, such as based on header information contained in the transmission data or by modulating the transmission transmitting for receipt by only intended recipient stages. The program instructions, for example, are received at the receiver 368, decoded and provided as digital data to the processor 360. The processor 360, upon recognizing the data as program instructions, may store them in its associated memory, such as may be volatile memory 362 (e.g., RAM) or non-volatile memory (e.g., FLASH, EPROM, etc.). The program instructions, for example, may include parameters that control the transmission rate (which may be variable, fixed, or condition responsive), as well as control operation of the encoder sensor 346.

In view of the foregoing, it will be apparent that such a multi-axial encoder system could be implemented, in accordance with an aspect of the present invention, with respect to each of the examples shown and described with respect to FIGS. 5, 5A, 6, and 6A. Those skilled in the art will understand appreciate other modes of data communication that could be utilized to implement a desired level of control and data transfer, all of which are contemplated as being within the scope of the present invention.

In view of the foregoing examples of wireless encoder systems of FIGS. 5, 5A, 6, and 6A, it also is to be appreciated that such encoder systems may be used in conjunction with a magnetic encoder system, such as shown and described with respect to FIG. 4. Alternatively, the magnet encoder may be omitted, with the encoder operation being accomplished using a wireless encoder system, such as described herein.

In another aspect, the motor controller 18, 118, 218, 318 also may be coupled to a Local Area Network (LAN) (not shown). The LAN connection may be employed to facilitate programming of the motor system, including the operation of the wireless encoder at each motor stage.

By way of particular example, an encoder system may be operable to collect and transmit encoder data in situations when the path 14, 114, 214, 314 has multiple axes. That is, the stage 12, 112, 212, 312 may be moveable in three dimensional space along one or more orthogonal axes X, Y, Z, as well as one or more rotational axis θ, such as may circumscribe about one of the axes X, Y, and Z. Thus, in accordance with an aspect of the present invention, each stage 12, 112, 212, 312 is configured to transmit encoder data indicative of position or movement relative each axis.

For example, a stage 12, 112, 212, 312 may include an encoder sensor 46, 146, 246, 346, a pulse generator 48, 148, 248, 348 and transmitter 52, 152, 252, 352 for each axis. To help reduce power consumption by such encoder circuitry, such as shown in FIGS. 5A and 6A, the memory 162, 362 may store program instructions so that processor 160, 360 selectively controls operation of encoder sensors 146, 346 and transmitters 152, 352 to collect and transmit position data based on which axis (or axes) is being traversed by the stage 112, 312.

By way of further example, if a stage 12, 112, 212, 312 is moving along the Z-axis and rotating in the direction θ about the Z-axis, it may be desirable to enable operation of the encoder systems associated with the Z and θ axes while disabling operation of the other axes X and Y. In this way, the Z and θ transmitters would transmit position data for each respective axis Z and θ, thereby providing motor controller 18, 118, 218, 318 position data for the stage 12, 112, 212, 312 relative to the Z and θ axes. In addition, the position information may be utilized to provide closed loop control of the respective encoder systems based on the motor controller 18, 118, 218, 318 determining the position of the stage 12, 112, 212, 312.

Figure 7:
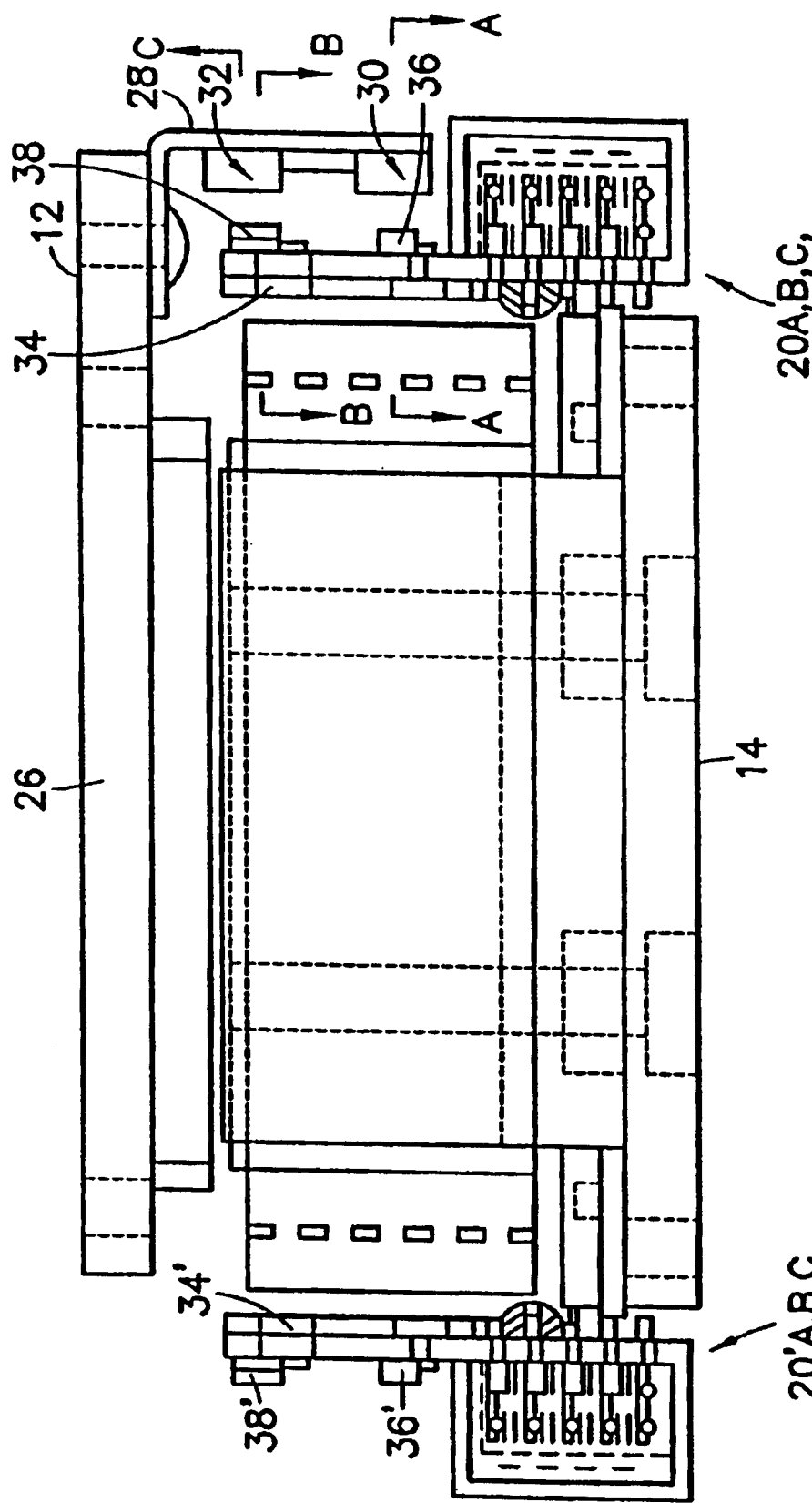
FIG. 7 is a cross section of part of a linear motor operable to control two movable stages along the same path.

Referring now to FIG. 7, a representative aspect of the invention is shown in which it is possible to drive more than one movable stage 12 along path 14. Each movable stage 12, for example, requires independent application of armature power from motor controller 18, independent armature switching and independent position communication from the movable stage back to motor controller 18. In addition to movable stage 12, a second rail 34' is provided on the second side of path 14 for use by a second movable stage (not shown). The second movable stage is similar to movable stage 12, except that a pendant arm 28' (not shown), supporting switching and encoder magnets (not shown), if in a visible position, would be located on the left side of the drawing. Second rail 34' includes encoder sensors 38' and switching sensors 36', such as corresponding to the encoder and switching sensors shown and described with respect to FIG. 1B. Conductors 20'A, B and C carry motor drive power, separately generated in motor controller 18, to the switches feeding power to the armature windings 16A, B and C, along paths separate from conductors 20A, B and C. In this manner, the second stage is separately controlled, and its motion is separately fed back to motor controller 18. It is to be appreciated that, additionally or alternatively, a wireless encoder system, such as described above, with respect to FIGS. 5, 5A, 6, and 6A, could be associated with each stage in the multi-stage system in accordance with an aspect of the present invention.

Figure 8:
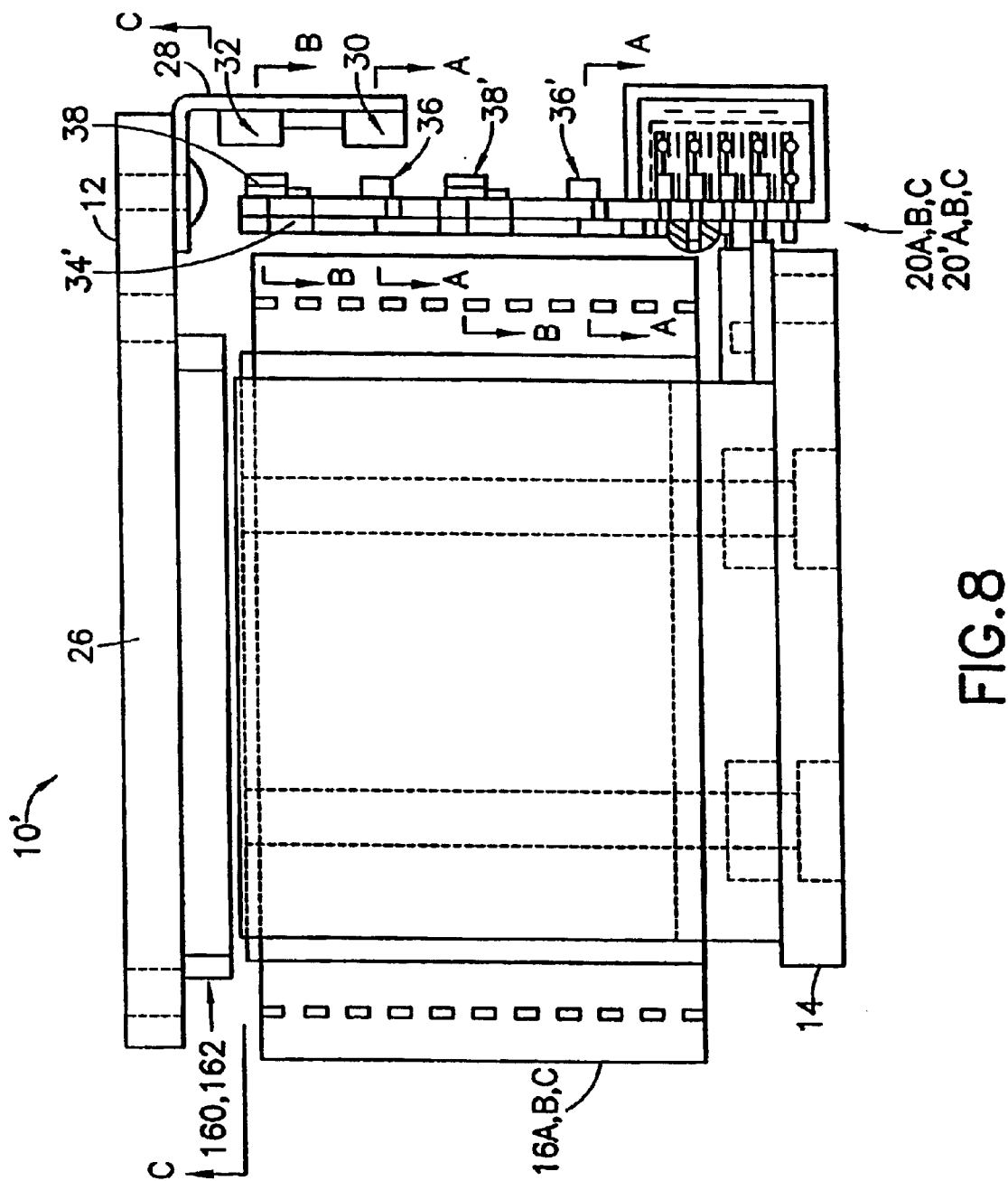
FIG. 8 is a cross section of part of a linear motor operable to control any desired number of stages along the same path.

FIG. 8 illustrates another aspect of the invention adapted to control and drive two movable stages 12 (and 12', not shown). In this example, rail 34' supports a second encoder sensor 38' and a second switching sensor 36' spaced below encoder sensor 38 and switching sensor 36. It will be understood that power to armature windings 16A, B and C is independently controlled by separate switches that feed motor power from conductors 20A, B and C, when influenced by switching magnet 30, and from conductors 20'A, B and C when influenced by switching magnet 30'.

Figure 9:
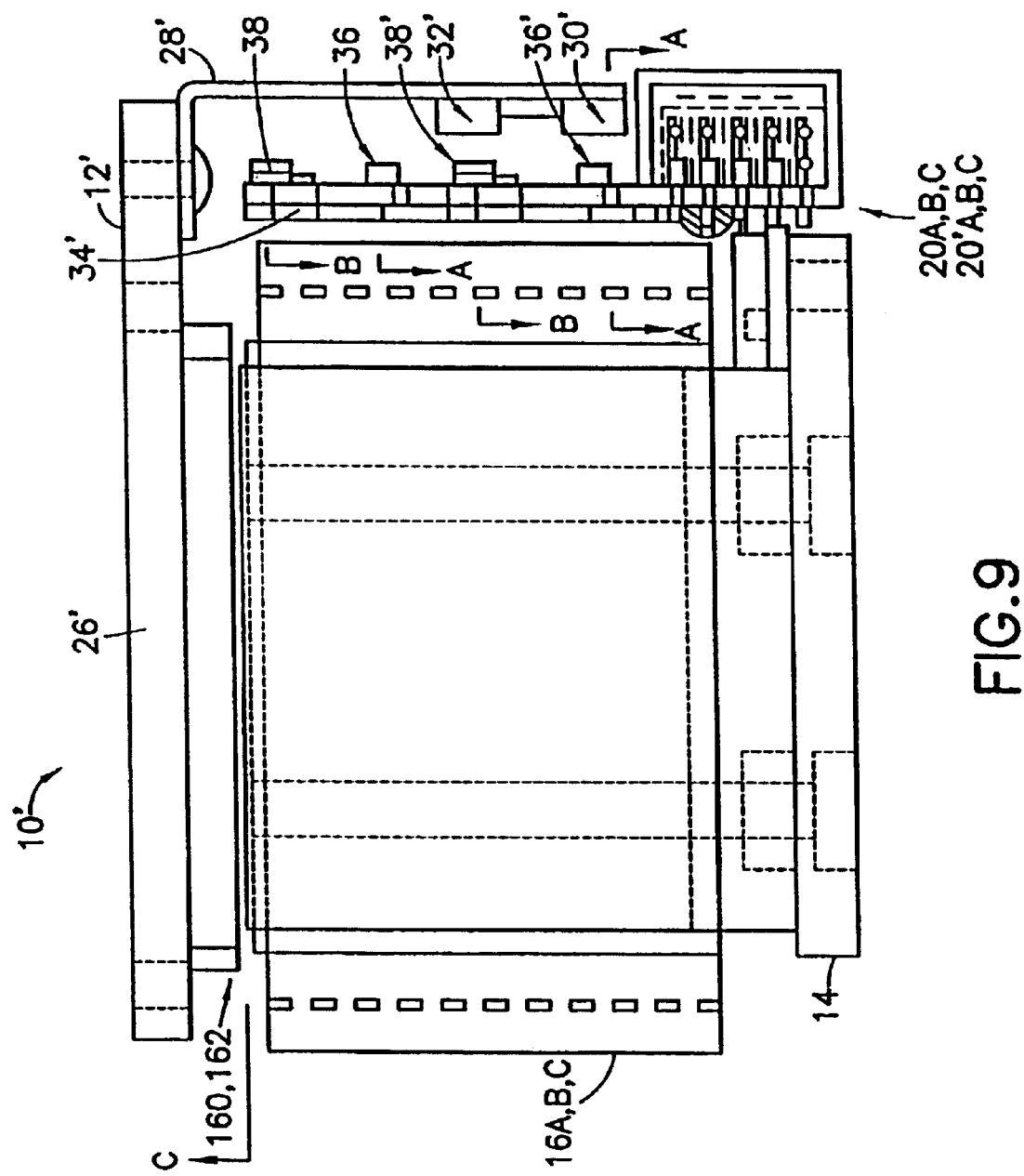
FIG. 9 is a cross section of part of a linear motor operable to control two or more stages along the same path.

Referring to FIG. 9, a second movable stage 12' is shown, for use with rail 34' of FIG. 8. Second movable stage 12' includes a pendant arm 28', on the same side of movable stage 12 of FIG. 8, but extending further downward to accommodate an encoder magnet 32' and switching magnet 30' aligned with second encoder sensors 38' and second switching sensors 36', respectively. It would be clear to one skilled in the art that more than two movable stages could be controlled by adding additional elements to rail 34', and by installing suitably long pendant arms 28, 28' . . . 28" to each movable stage 12.

Figure 10:
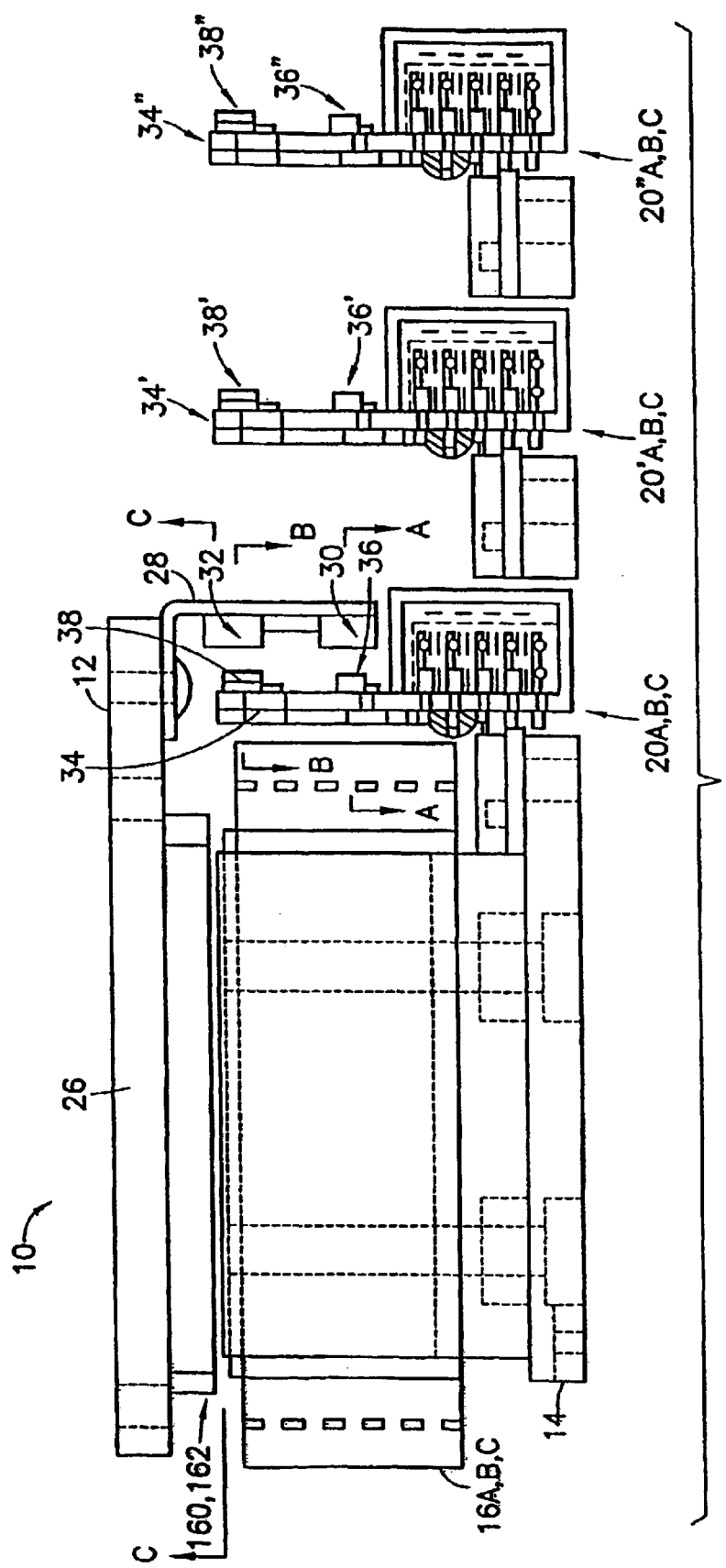
FIG. 10 is a cross section of part of a linear motor operable to control three or more stages along the same path.

The present invention is not limited to two movable stages on a single path. Any number of movable stages may be controlled independently along the same path 14. Referring to FIG. 10, for example, three rails 34, 34' and 34" are spaced parallel to each other outward from path 14. Each of rails 34, 34' and 34" includes thereon encoder sensors 38, 38' and 38", and switching sensors 36, 36' and 36". Each movable stage 12, 12' and 12" (only movable stage 12 is shown) includes a pendant arm 28, 28' and 28" (only pendant arm 28 is shown) adjacent to the sensors on its respective rail 34, etc. Encoder magnets 32, 32' and 32" (only encoder magnet 32 is shown), and switching magnets 30, 30' and 30" (only switching magnet 30 is shown) are installed on their respective pendant arms. With the interleaving of pendant arms 28, etc. between rails 34, etc., as many stages 12, etc. as desired may be accommodated, driven and controlled on a single path 14. In addition, control of such stages 12 may be facilitated by implementing a wireless encoder system with each stage in the motor system in accordance with an aspect of the present invention.

Figure 12:
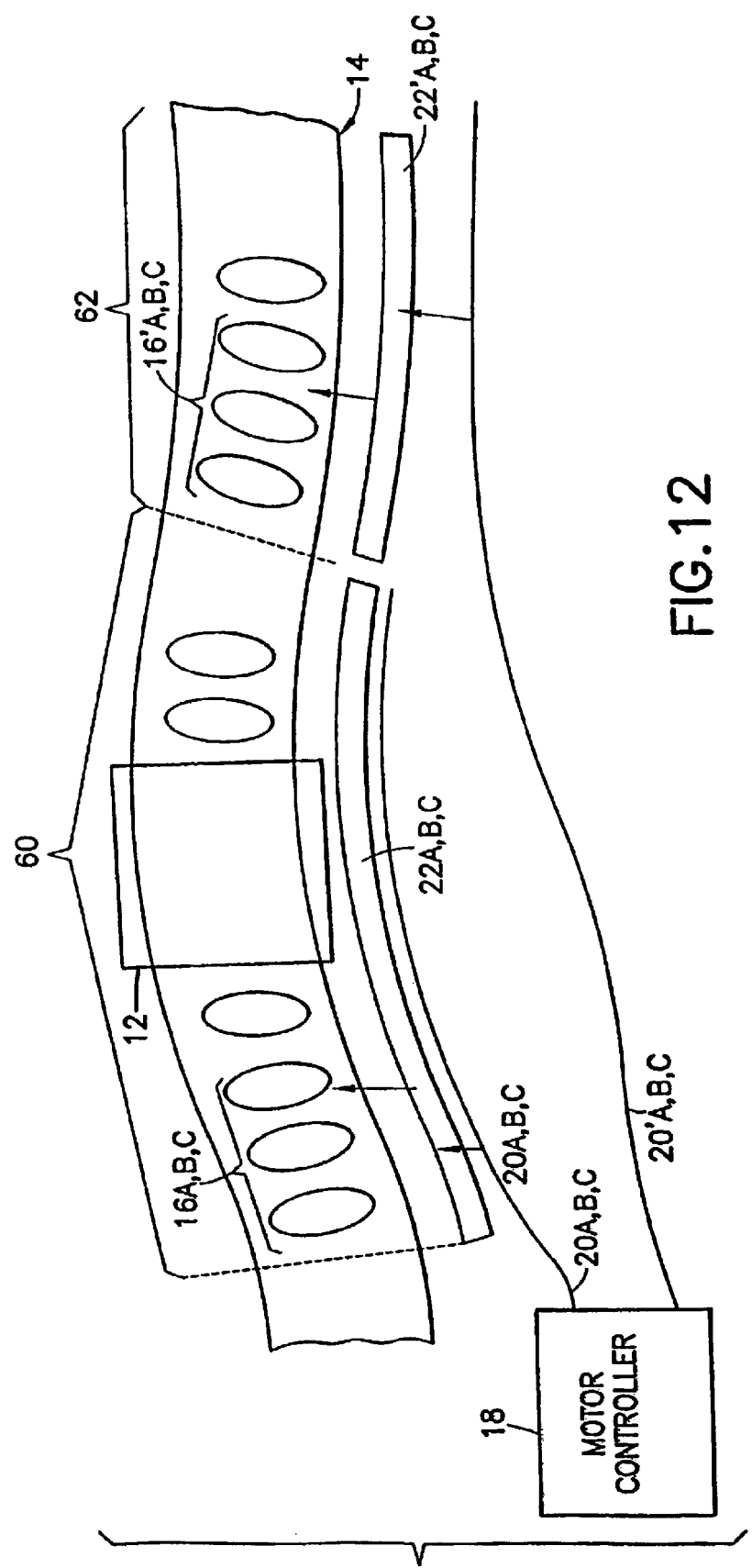
FIG. 12 is a diagram showing a path adapted for open-loop control of a movable stage over one section and closed-loop control over another section.

In some applications, it may be desirable to have closed-loop control in some regions of the path for precise positioning, but where open-loop control may be desirable over other regions of the path. Referring to FIG. 12, a region of closed-loop control 60, along path 14 receives drive power from motor controller 18 on a first set of conductors 20A, B, and C through magnetically actuated switches 22A, B and C, as previously described. Position or motion feedback in region 60, as previously described, permits motor controller 18 to accurately control the position and velocity of movable stage 12. A region of open-loop control 62, along path 14 receives drive power from motor controller 18 on a second set of conductors 20'A, B and C. When movable stage 12 is in region 62, motion feedback is either not generated, or is not responded to by motor controller 18. Instead, motor controller 18 generates a programmed phase sequence for open-loop control of movable stage 12. This drives movable stage at a predetermined speed. Once a region of closed-loop control is attained, movable stage 12 resumes operation under control of motor controller 18.

It is also possible to provide path switching, similar to the switching used on railroads, to direct movable stage 12 flexibly along different paths.

Figure 11:
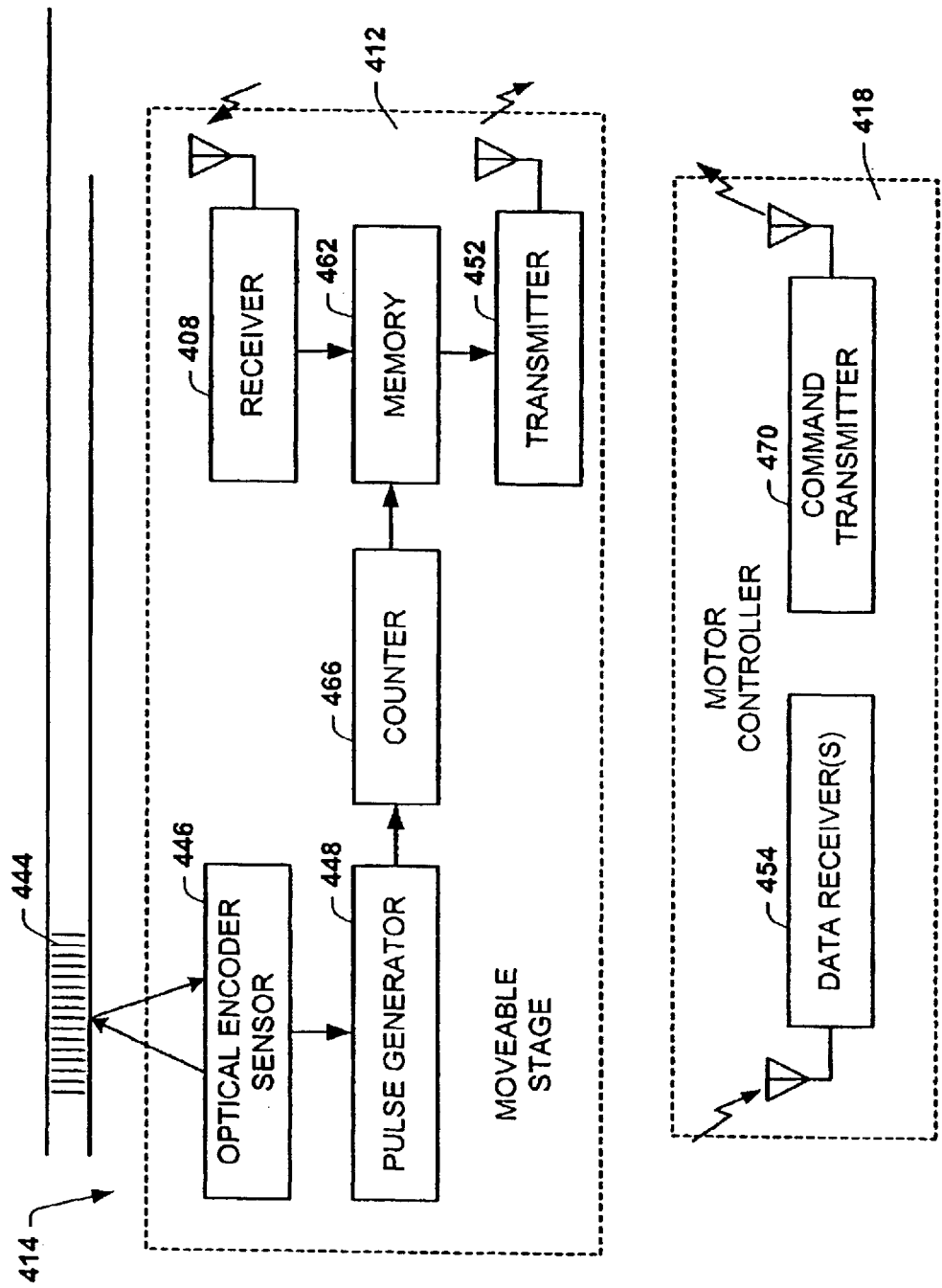
FIG. 11 is a schematic diagram of another example of a wireless linear motor employing a wireless encoder in accordance with the present invention.

FIG. 11 illustrates another example of a wireless encoder system, in which reference numbers, increased by adding 200, refer to similar parts previously identified with respect to FIG. 6. In FIG. 11, the stage 412 includes an optical encoder sensor 446 that emits light onto an indicia (e.g., a length of tape having fine parallel markings) 444 and receives reflected light indicative of the position and/or movement of the stage 412 relative to the path 414. As mentioned above, a similar encoder arrangement may be implemented in the stage 412 for each axis of the path 414. The encoder sensor 446 provides an encoder signal (e.g., sine or cosine) to a pulse generator 448. The pulse generator 448 provides a pulse output signal to a counter 466 based on the encoder signal. The counter 466, for example, stores a count value that varies as a function of the pulse signal from the pulse generator 448.

In this example, the stage 412 further includes a memory 64, which is operable to receive the count value from the counter 466. The memory also is coupled to a receiver 468 for receiving commanded motion information from a command transmitter at the motor controller 418. In accordance with an aspect of the present invention, the commanded motion information may include a command value that is stored in memory 462 for comparison with the count value. That is, the commanded count value is continuously compared with the count value of counter 466 until a commanded condition is attained, such as may correspond to the counter value reaching (or exceeding) the commanded count value. During the interval between storage of the information, and the accomplishment of the commanded condition, transmitter 452 may remain quiescent. In some applications, receiver 58 may also remain quiescent during such interval, thereby consuming a reduced amount of battery power.

The stored command value further may be modified in response to commanded motion information received at the receiver 468 from the command transmitter 470 to, in turn, control operation of the transmitter 452. For example, a particular count value may be employed at different positions along the path. In addition or alternatively, different command count values may be provided to the receiver 468 during different operating modes, such that a greater resolution of position is obtained in one operating mode and a lesser resolution is utilized in another mode.

Figure 13:
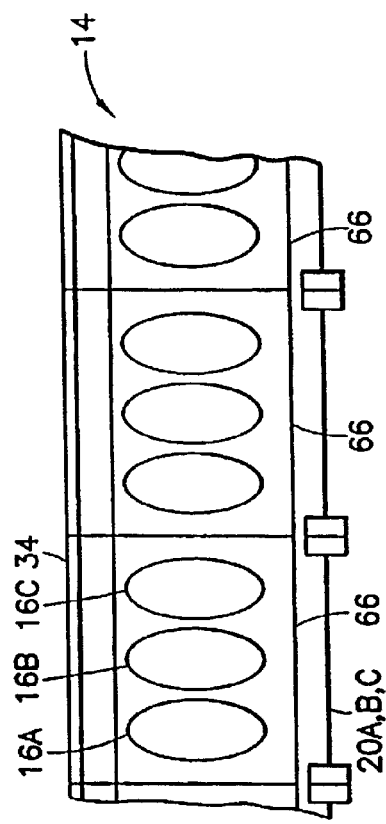
FIG. 13 is a diagram showing several path modules connected together to form a path.

Referring now to FIG. 13, the power consumption of the above-described system is independent of the length of path 14, since only active armature windings 16 are energized. Consequently, it is convenient to be able to construct a path 14 of any length by simply adding path modules 66 end to end. Each path module 66 includes at least one armature winding 16, an associated portion of rail 34 and conductors 20A, B and C. Conductors 20A, B and C on adjacent path modules are connected together by connectors 68. Path modules 66 are illustrated to contain three armature windings 16A, B and C. It will be understood that switching sensors, together with their semiconductor switches, for the contained armature windings are mounted on the portion of rail 34 associated with that path module 66. In addition, position feedback, if magnetic encoder sensing is used, is also included on suitable path modules 66. As noted above, encoder sensors are spaced relatively widely apart. For example, each path module should be long enough to contain at least one encoder sensor group. One system of this sort has been long enough to contain 9 armature windings (3 repetitions of phases A, B and C armatures). Additionally or alternatively, for a wireless encoder system, appropriate indicia may be provided along the path 14, such as for interaction with an encoder sensor implemented on the stage in accordance with an aspect of the present invention.

Figure 14:
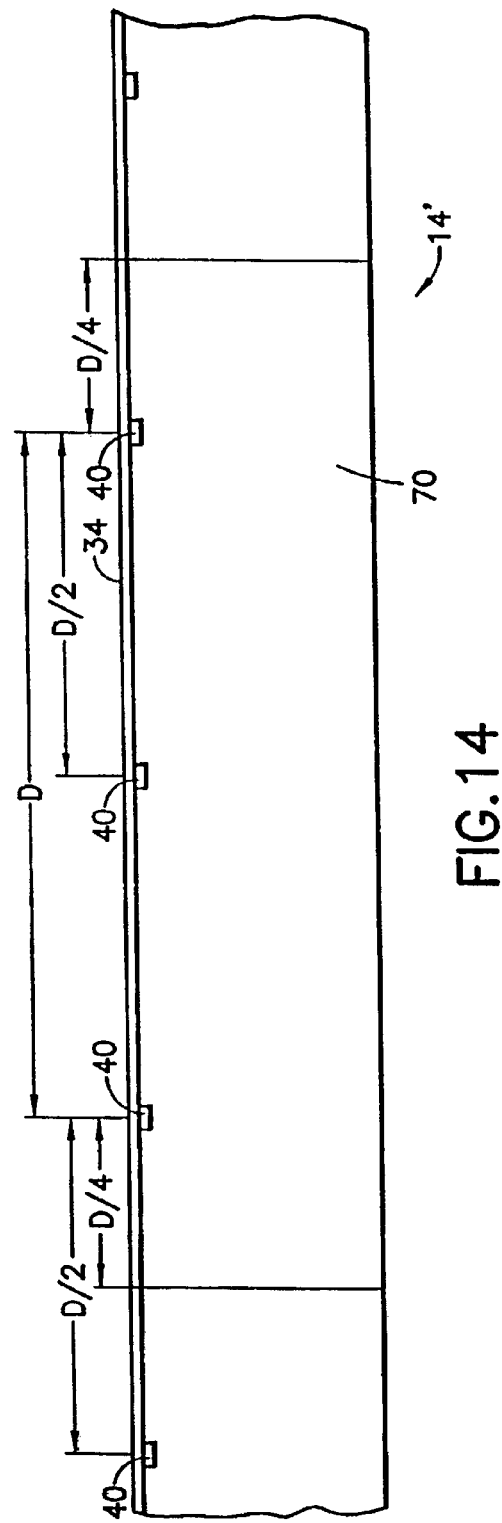
FIG. 14 is a diagram showing an example of a path module having three encoder sensor groups spaced along the path of the module.

Referring now to the example illustrated in FIG. 14, a path module 70 includes armature windings, as described above, plus three encoder sensor groups 40 spaced D/2 apart (where D is the center-to-center spacing of beveled magnetic zones 42 at the ends of encoder magnet 32). Path module 70 extends a distance D/4 beyond the outer encoder sensor groups 40. In this way, when the next path module 70 is connected end to end, the distance between the nearest encoder sensor groups 40 on the mated path modules 70 is D/2 as is desired. Path modules 70 are connected together to form a path 14' of any desired length or shape.

FIG. 15 illustrates another example that includes two path modules 72, 74 having armature windings, such as described above. One module has an encoder sensor group 40, and another module does not contain an encoder sensor. Path modules 72, 74 are connected together to form a path 14" such that encoder sensor groups 40 in path modules 72 are spaced D/2 apart (D is the center-to-center spacing of beveled magnetic zones 42 at the ends of encoder magnet 32). Any desired path 14" can be achieved using a combination of path modules 72 and 74. It is understood by one skilled in the art that other arrangements of path modules 72, 74 can be used to form any desired shape or length path 14''' and any other desired spacing of encoder sensor groups 40, so long as provision is made for spacing encoder sensor groups 40 a desired repeating distance apart. One aspect includes a modular path module from which encoder sensor groups are omitted. However, provision is made for clamping, or otherwise affixing, encoder sensor groups 40 anywhere along the assembled modular path. When affixing the encoder sensor groups 40, the appropriate spacing (D, D/2, D/4, etc.) is observed to ensure that the encoding signal is produced without distortion or dropouts during transitions from one path module to another.

FIG. 16 illustrates a path 14''' in accordance with another aspect of the present invention. The path 14''' is formed of a plurality of path modules 76 that include armature windings, as described above, and an encoder sensor group 40. Modules 76 are connected together to form the path 14''' such that encoder sensor groups 40 in path modules 76 are spaced D/2 apart (where D is the center-to-center spacing of beveled magnetic zones 42 at the ends of encoder magnet 32 of the stage (not shown)). Any desired length or shape path 14''' can be achieved using a combination of path modules 76.

The connection of signals and power along linear motor 10, especially in the case of modular devices, has been described with wires and connectors joining wires in adjacent modules. Other techniques for carrying signals and power may be employed without departing from the spirit and scope of the invention. For example, instead of using wires, conductive traces on a rigid or flexible substrate may be used.

It will be noted that path 14 (e.g., FIGS. 1A and 12) is shown as containing curves. It is a feature of the present invention that path 14 is not restricted to a straight line, as is frequently the case with the prior art. Instead, due to the nature of the present invention, linear motor 10 can be arranged to follow any desired path, including a straight path, curved path 14 as shown, or a closed path wherein movable stage 12 can repeatedly trace a closed path, moving in a single direction, or moving back and forth to desired locations anywhere along the open or closed path.

Figure 22:
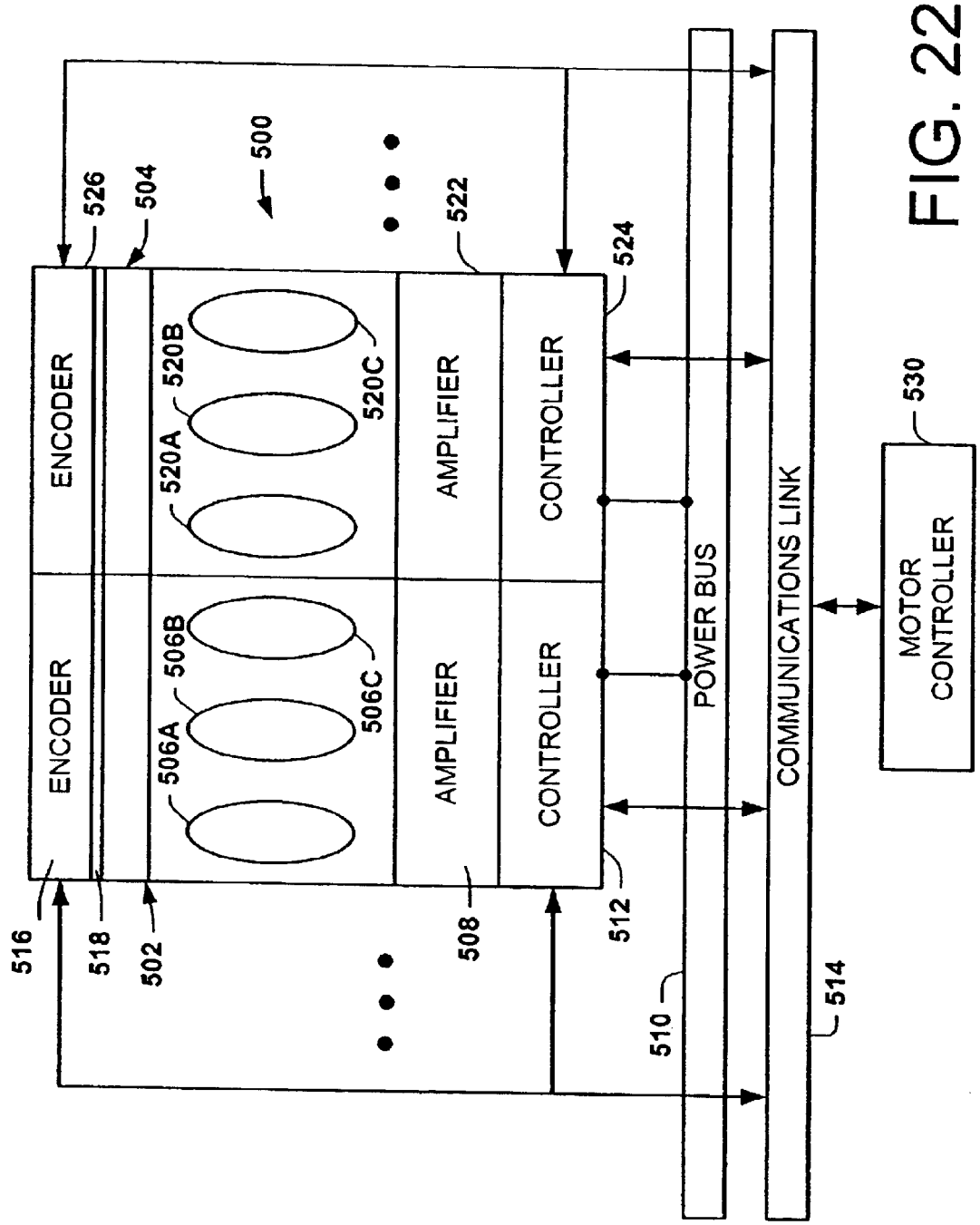
FIG. 22 is diagram of part of a linear motor path, illustrating an example of a path module in accordance with the present invention.

FIG. 22 illustrates another example of a linear motor path 500 formed of a plurality of path modules 502 and 504 in accordance with an aspect of the present invention. While, for purposes of brevity, two modules 502 and 504 are illustrated, it is to be appreciated that any number of modules can be utilized to form a path, as indicated by the ellipsis, which path has a desired shape and length. Each path module 502, 504 is substantially similar in configuration. Referring first to the module 502, the module includes a plurality of armature windings 506A, 506B, and 506C, such as a three-phase network.

The module 502 also includes an amplifier 508 coupled to the windings 506A, 506B, and 506C. The amplifier 508, for example, includes an array of switching devices (electrically coupled between a power source, such as a power bus 510 and the windings 506A, 506B, and 506C. The amplifier may include a single or multi-stage amplifier and a plurality of power switches (e.g., MOSFET transistors, thyristors, etc.) arranged to selectively provide electrical energy to the windings 506A, 506B, and 506C. The electrical energy from the amplifier 508 controls the direction and magnitude of the field produced by each of the windings 506A, 506B, and 506C, which may interact with a stage to effect its movement along the path 500.

The module 502 also includes a module controller 512 which is operative to control the amplifier 508 and, in turn, the amount of electrical energy provided to the windings 506A, 506B, and 506C. The controller 512 is coupled to a communications link 514 for receiving information and/or instructions relating to energization and deenergization of the windings. The controller 512, for example, is programmed and/or configured to process information received from the communications link 514 and determine appropriate control signals to achieve a corresponding level of coil energization. The determination by the controller 512 may be accomplished using a look-up table in a microcomputer having predetermined stored values or by calculation in accordance with a desired control function based on the information received via the communications link 514.

The module 502 further may include an encoder system 516 positioned along a rail 518, such as is coextensive with the path 500. The encoder system 516 may include one or more encoder sensors that provide signals indicative of the position of a stage relative to the portion of the path 500 associated with the module 502. The encoder 516 may provide the position information to the module controller 512 and/or to the communications link 514. By way of example, the encoder system may be a magnet encoder system, such as shown and described with respect to FIG. 4, although other types and configurations of encoding systems also could be used. For example, the encoder system 516 also may include an inductive encoder, an optical encoder, a capacitive encoder, etc. Alternatively or additionally, the controller 512 may provide the position information to the communications link 514 and including identifying data to indicate from which module and/or encoder sensor the position information originated.

The other modules 504, etc. may be substantially similar in configuration to the module 502. Briefly stated, the module 504 includes a plurality of windings 520A, 520B, and 520C which are coupled to an amplifier system 522. A controller 524 is coupled to the amplifier 522 to control energization of the windings 520A, 520B, and 520C based on control information received from the communications link 514. An encoder system 526, which may be positioned along the rail 518, may provide position information to its associated controller 524 as well as to the communications link 514. As mentioned herein, the rail 518 may be formed from corresponding extensions in adjacent modules (See, e.g., FIG. 1B).

A motor controller 530 is coupled to the communications link 514 for controlling operation of the path modules 502 and 504 in the linear motor system in accordance with an aspect of the present invention. The motor controller 530 receives information indicative of the position of one or more stages that may be moveable along the path. In one aspect, the position information is determined from the encoder signal provided from the encoder systems 516, 526 in each module. For example, the encoder signals provided to the communications link (e.g., from the encoder directly and/or from the associated module controller) include address information identifying each module and/or sensor that provided the position information. Because the position of each module and the position of the encoder sensor(s) in each module are known by the motor controller 530, the absolute position of a stage relative to the path 500 may be determined from the position signals.

To mitigate unnecessary position signals from the encoder systems 516, 526, activation of the encoder systems 516 and 526 may be limited to situations when a stage is within the vicinity of the encoder sensor. By way of example, each encoder sensor 516, 526 may employ switches and/or sensors that are activated in response to magnetic influence of a stage (e.g., the switches 22A, 22B, 22C of FIG. 1A). Alternatively, or additionally, each encoder system 516, 526 may receive control signals from its respective controller 512, 524 and/or from the motor controller 530 via the communications link 514. The motor controller 530 thus may employ the position information from each encoder system 516, 526 to effect an absolute encoding scheme to help improve operation and control movement of a stage along the path 500.

As mentioned herein, the motor controller 530 is programmed and/or configured to effect desired movement of one or more stages along the path 500. The motor controller 530 thus provides control instructions via the communications link 514 to one or more selected module controllers 512, 524 based on the determined position of the stage. The control instructions are addressed to desired controllers, such as by providing appropriate address information in a header of a message or a packet of a message. An address (or other identifying data) also may be provided for each winding to be energized. Each controller 512, 524 operates based on appropriately addressed instructions. That is, each controller 512, 524 determines the magnitude and direction of energization and which winding (or windings) need to be energized to effect selected movement of a stage based on the control information provided by the motor controller 530.

Figure 23:
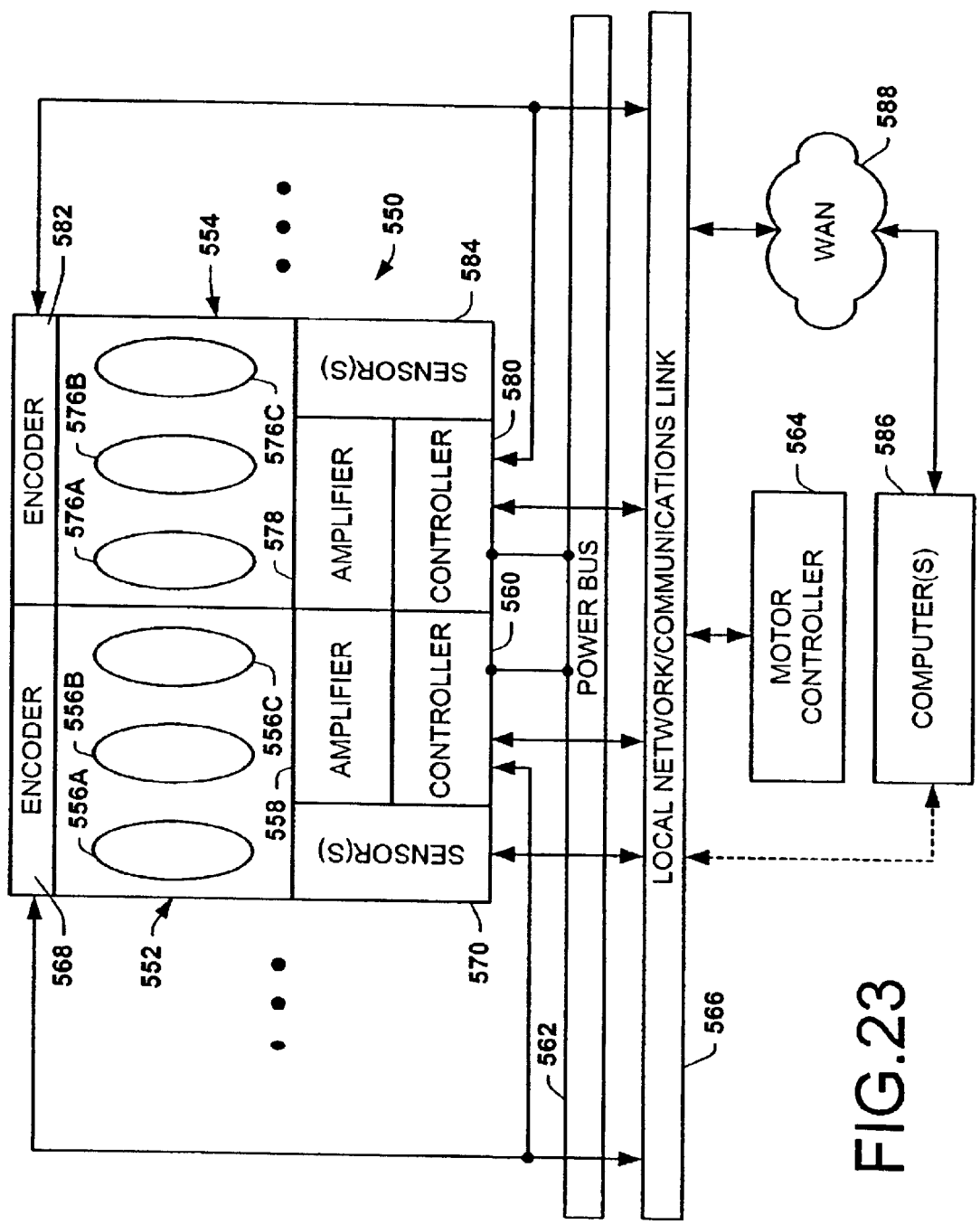
FIG. 23 is a diagram of part of a linear motor path, illustrating another example of a path module in accordance with the present invention.

FIG. 23 illustrates another example of a path 550 for a linear motor system in accordance with an aspect of the present invention. For purposes of brevity, the path 550 is illustrated as including path modules 552 and 554, although it is to be appreciated that any number of modules may be utilized to form a path. The path module 552 includes a plurality of armature windings 556A, 556B, and 556C coupled to an amplifier 558. The windings 556A, 556B, and 556C may be non-interlaced and spaced apart in the direction of the path 500. The amplifier 558 is coupled to a module controller 560, which is operative to control application of electrical energy from a power bus 562 to the windings 556A, 556B, and 556C. More particularly, the module controller 560 controls the amplifier 558 based on control information received from a motor controller 564 via a communications link 566. The amplifier 558, in turn, provides a corresponding excitation current to energize the windings based on the instructions from the controller 560.

The communications link 566 may be a hardwired data communication path (e.g., made of twisted pair cable, shielded coaxial cable or fiber optic cable) or may be wireless or partially wireless in nature. Those skilled in the art will understand and appreciate various networking environments and (wired and wireless) communications protocols (e.g., RS232, RS485, TCP/IP, Ethernet, Fibre Channel, Bluetooth, cellular, etc.) that may be employed to enable communications in the system shown in FIG. 23, all of which are contemplated as falling within the scope of the present invention. The motor controller 564, thus, may address information to selected path modules 552 and/or 554 as well as may provide globally addressed information to all modules or to those within a selected group of modules.

The path module 552 also may include an encoder system 568 operative to detect the position of a stage relative to the path module. As mentioned herein, the encoder system 568 may employ an optical encoding scheme, an inductive encoding scheme, a capacitive encoding scheme, and/or magnetic encoding scheme. The encoder system communicates position information to the module controller 560 and/or to the motor controller 564 via the communications link 566. The position information further may identify from which module and/or sensor(s) such position information originated so as to facilitate an absolute encoding scheme in accordance with an aspect of the present invention. The position information from the encoder 568 associated with the module 552 also may be utilized in conjunction with a wireless encoding system, such as shown and described with respect to FIGS. 5, 5A, 6, 6A and 11.

In accordance with an aspect of the present invention, the path module 552 also includes one or more sensors 570 operative to sense a condition of the path module and provide an indication of the sensed condition. The sensor(s) 570 may be coupled to the communications link 566 for providing an indication of the sensed condition(s). Additionally or alternatively, the sensor(s) 570 may be coupled to the module controller 560, which may package the sensor data and send it over the communications link 566.

By way of example, the sensors 570 could be utilized to monitor one or more conditions of the armature windings 556A, 556B, and 556C, such as current sensors to monitor current flow through the windings. The indication of the sensed current further may be employed to detect leakage current and/or electric short conditions for each of the windings 556A, 556B, and 556C. The sensor(s) 570 also may include thermal sensors to monitor temperature conditions, such as associated with a switching circuit of the amplifier 558 and/or the windings 556A, 556B, and 556C. Those skilled in the art will understand and appreciate other types of sensors that may be utilized to monitor other conditions associated with the path module 552 (e.g., moisture, switching characteristics, vibration, etc.) in accordance with an aspect of the present invention.

The path module 554, which is connected adjacent the module 552, is substantially identical to the other module 552. Briefly stated, the path module 554 includes armature windings 576A, 576B, and 576C coupled to an amplifier 578. A module controller 580 is coupled to the amplifier 578 to control the amplifier and effect desired energization of the windings 576A, 576B, and 576C. The controller 580 thus implements such control of the amplifier 578 based on control information from the remote motor controller 564 received via the communications link 566. The path module 554 also may include an encoder system 582 for monitoring position of a stage relative to the portion of the path 550 defined by the path module 554. The encoder system 582 may be coupled to the module controller 580 and/or to the communications link 566 to provide an indication of stage position sensed by the encoder system. One or more path module condition sensors 584 also may be integrated into the path module 554 to monitor selected operating conditions of the path module.

The sensor information from the path module sensors 570, 584 may be received by the motor controller 564 and/or by one or more other devices. For example, one or more diagnostic computers 586 may be connected to receive sensor information from the sensors 570 and 584 of the path 550. In one aspect, the computer 586 may be a workstation, a server computer, a router, a peer device or other common network node connected directly to the communications link 566, as indicated by a dashed connection line. Alternatively or additionally, the computer 586 may be connected to the local communications link 566, for example, via an enterprise-wide computer network, an intranet and/or Internet, indicated at 588. Those skilled in the art will understand and appreciate various networking environments and (wired and wireless) communications protocols that may be utilized to enable communications in accordance with the present invention.

The diagnostic computer 586 may receive information indicative of various operating conditions for each module 552, 554 in the path 550. Each item of information, for example, includes information identifying the path, the module where the condition was sensed, the type of condition being sensed and a value indicative of the of the sensed condition. Table I illustrates examples of information that could be received and stored at the computer 586. The computer 586, for example, may collect such data from a plurality of modules in one or more paths, indicated in Table I as Path#1 through Path#N. The data associated with the table may be accumulated over time and analyzed at the computer 586. To facilitate communication of module-related data, each module controller 560, 580 may provide useful header information to identify what the sensed information represents.

TABLE I

| Path ID | Module ID | Condition Type | Component | Status Value |
|---------|-----------|----------------|-----------|--------------|
| Path #1 | Module1   | Current Sense  | Winding A | Value        |
| Path #1 | Module1   | Current Sense  | Winding B | Value        |
| Path #1 | Module1   | Current Sense  | Winding C | Value        |
| Path #1 | Module1   | Vibration      |           | Value        |
| Path #1 | Module1   | Temperature    |           | Value        |
| Path #1 | Module1   |                |           |              |
| Path #1 | Module2   | Current Sense  | Winding A | Value        |
| Path #1 | Module2   | Current Sense  | Winding B | Value        |
| ...     | ...       | ...            | ...       | ...          |
| Path #N | Module1   | Current Sense  | Winding A | Value        |

As shown in Table I, for example, the sensed information may include a path ID, such as may correspond to an IP address for the path or other information to uniquely identify from which path the sensed conditions originated. The information further may include a module ID to identify from which module the information originated. The computer 586 also receives an indication as to the type of condition sensed, the component associated with the sensed condition, as well as a value indicative of the sensed condition. The value may be correspond to raw data collected by the sensor, such as a voltage or current value, or it may be a more general indication of the health of the component or selected parts of a given module based on an evaluation of the sensor data. The computer 586 thus may analyze data collected over time and provide recommendation or suggestions as needed.

By way of example, a vendor of the linear motor system may maintain the remote computer. The vendor, for example, may compile operating data for one or more of its customers over time and analyze such data versus empirical data, so as to provide value added services to their customers, including predictive maintenance and advise of available upgrades.

Once the computer 586 has the compiled the information from the components of a path, the computer can provide a report identifying suggested upgrades and/or areas that may require service. By way of illustration, a vendor providing such services further may arrive at a customer's site with the appropriate replacement parts and/or upgrades based on the collected data. This mitigates possible miscommunication between the vendor and their customers, while also reducing any factory downtime experienced by the customer.

It should be appreciated that certain upgrades or fine tuning of components could be performed automatically by the computer 586 or by a vendor monitoring the computer. For example, a specific software revision upgrade for selected module controllers 560, 580 could be automatically downloaded to the linear motor. Furthermore, the calibration of the sensors 570, 584 could be automatically performed by downloading a calibration routine to the local motor controller 564 or invoking a calibration routine already residing on one or more of the sensors by sending a specific message or signal. In addition, different modules could be reconfigured differently to help optimize system performance, such as based on the location along the path and the particular use of the motor system.

Figure 24:
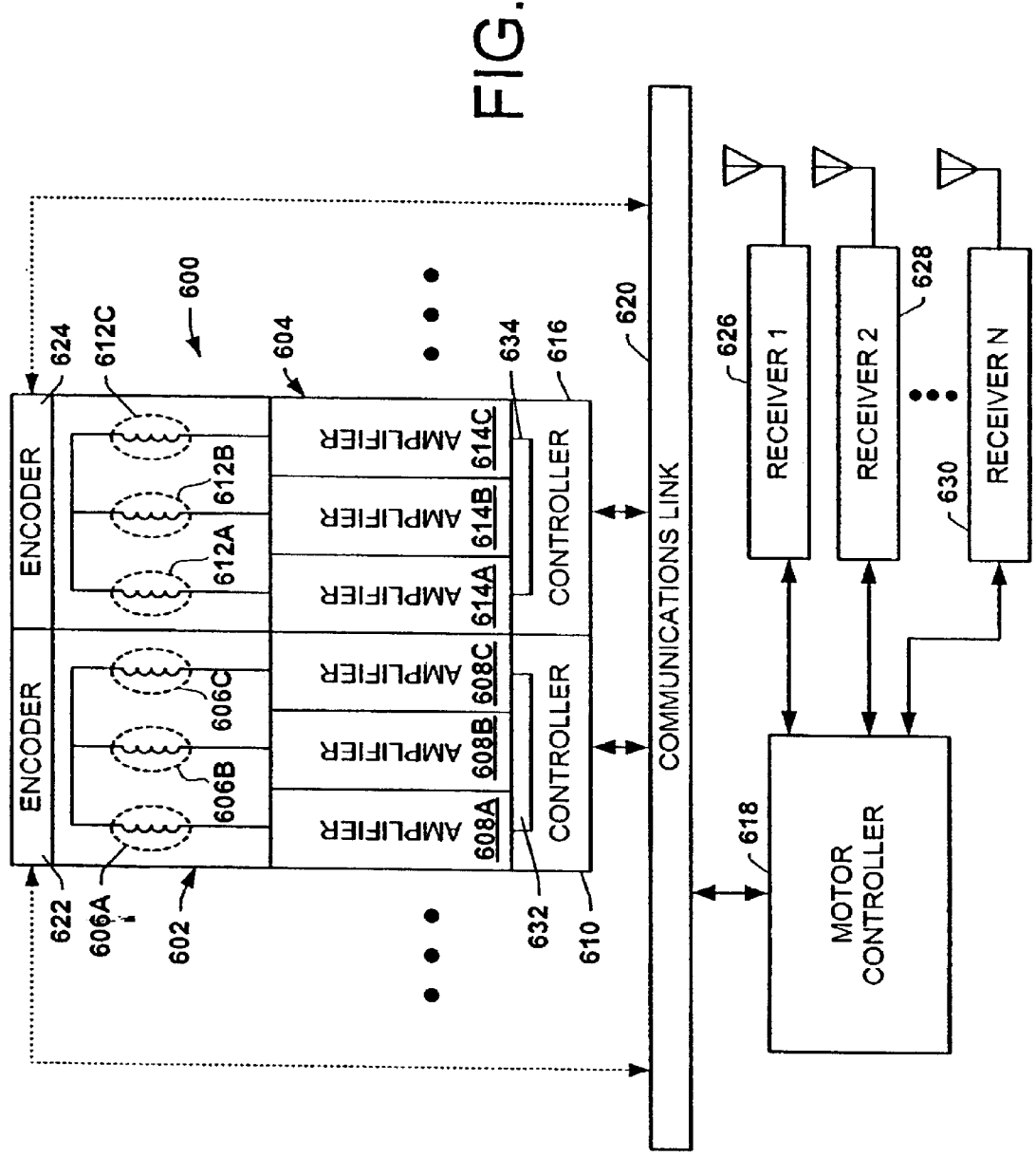
FIG. 24 is a diagram of part of a linear motor path, illustrating an example of a path module in accordance with the present invention.

FIG. 24 illustrates another example of a path 600 for a linear motor system in accordance with an aspect of the present invention. The path 600 includes a plurality of path modules 602 and 604 connected together to provide a desired shape and length. The path module 602 has a plurality of armature windings 606A, 606B, and 606C, each of which is coupled to an associated amplifier 608A, 608B, and 608C. The amplifiers 608A, 608B, and 608C are coupled to a module controller 610 that is operative to control each amplifier to selectively energize each respective armature winding 606A, 606B, and 606C. Similarly, the path module 604 has a plurality of armature windings 612A, 612B, and 612C coupled to associated amplifiers 614A, 614B, and 614C. A module controller 616 is coupled to the amplifiers 614A, 614B, and 614C to control each amplifier so as to selectively energize the armature windings 612A, 612B, and 612C.

The controller 610 and 616 of each module receives control information from a system controller 618 of the motor system via a network communications link 620. The communication link 620 may implement a wired (e.g., electrically conductive or optical) or wireless (e.g., Bluetooth, cellular, etc.) data communications protocol. Those skilled in the art will understand and appreciate various data communications protocols (e.g., TCP/IP, Ethernet, Asynchronous Transfer Mode (ATM), Fiber Distributed Data Interface (FDDI), Fibre Channel, etc.) that could be utilized in accordance with an aspect of the present invention.

Each path module 602, 604 further may include a respective encoder system 622, 624 for detecting position information as a stage moves relative to each respective module. The encoder systems 622 and 624, for example, may be magnetic (e.g., see FIG. 4), inductive, capacitive, or optical. Alternatively or additionally, a wireless encoder system, such as shown and described with respect to FIGS. 5, 5A, 6, 6A, and 11, could be utilized to collect an indication of the position and/or movement of one or more stages along the path 600. In this regard, a plurality of receivers 626, 628, and 630 are coupled to the system controller to receive wireless signals from one or more stages that may be moveable relative to the path 600 indicative of movement and/or position of each stage. A separate receiver may be utilized for each available axis of movement (e.g., X, Y, Z, and/or θ) for each stage in the path 600, although a communication protocol could be implemented that utilizes a common receiver in accordance with an aspect of the present invention. The motor controller 618 employs the position information such as to determine which armature windings need to be energized to effect desired movement of each stage.

The motor controller 618 provides corresponding control information to the module controllers associated with the windings that are to be energized. In accordance with a particular aspect, the system controller 618, for example, may address the control information to each target module (e.g., Module ID) and/or to a specific winding located in the module (e.g., Winding ID) as well as a value identifying a desired level and direction of electric current to be applied to the target winding(s).

In accordance with an aspect of the present invention control information from the motor controller is addressed to each armature winding. As a result, the controllers 610 and 616 are able to independently control each associated armature winding based on control information received from the motor controller 618. As mentioned above, the motor controller 618 determines how to energize the windings based on the stage position information, such as received from the encoders 622 and 624 and/or received at the receivers 626–630. The control information, for example, may be derived by using a look-up table in a microcomputer of the motor controller 618 having predetermined stored values or by calculation in accordance with a desired control function. Such control information may be determined for more than one cart or stage, which may be moveable along the path 600. The motor controller 618 provides corresponding instructions to one or more selected controllers 610, 616, which information is addressed to selected armature windings or amplifiers. The motor controllers 610, 616 process the instructions and provide corresponding control information to appropriate amplifiers 608, 614 based on which windings are identified in the instructions from the motor controller 618. Each amplifier 608, 614 receiving control information, in turn, performs switching functions to energize its associated armature windings 606, 612 at a desired level and direction.

While the particular armature windings 606 and 612 in the respective path modules 602 and 604 of FIG. 24 are illustrated as having three phases, those skilled in the art will understand and appreciate that the present invention is not restricted to a three phase implementation. That is, any number of one or more phases may be utilized in each path module, with each phase or coil being independently addressable in accordance with an aspect of the present invention.

One or more sensors 632 and 634 also may be associated with each module 602 and 604, respectively, to sense various conditions of the modules. For purposes of brevity a description of the conditions that may be sensed, at each module, in accordance with an aspect of the present invention has been omitted, as reference may be made to the description associated with FIG. 23 and to Table I.

In view of the examples of FIGS. 22–24, it is to be appreciated that the illustrated aspects of the present invention provide for a system in which path modules may operate with enhanced functionality. Integrating motor control functionality, amplifiers, and armature windings into each module facilitates independent control of armature windings. An absolute encoding scheme also is enhanced due to the improved modularity and addressability of the windings. The control of one or more stages, which may be moveable along a path, is further improved due to the addressability of windings within the modules.

Figure 17:
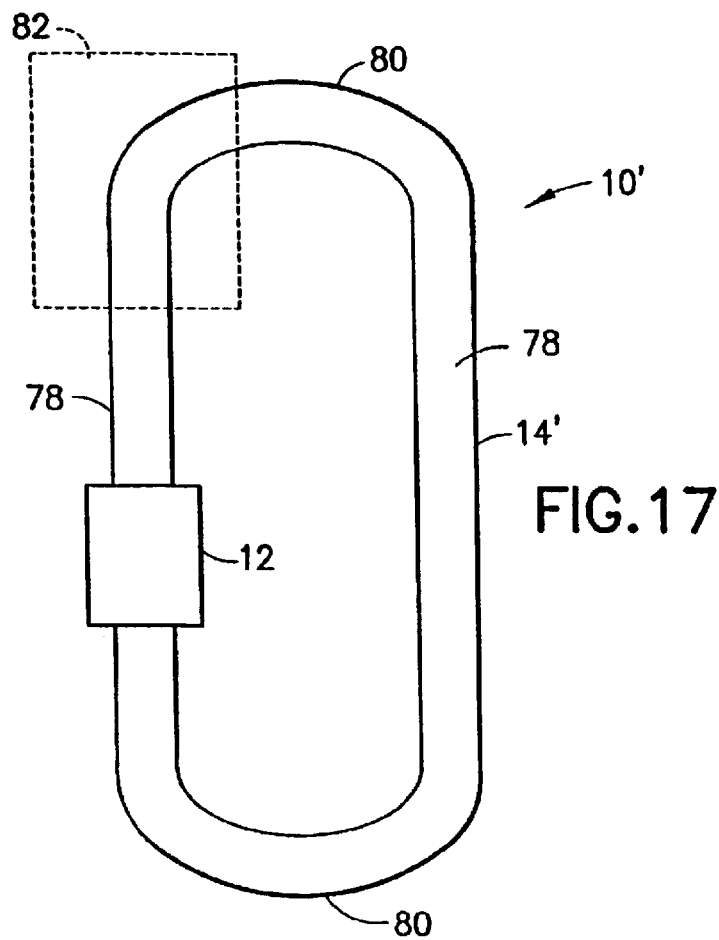
FIG. 17 is a diagram of a linear motor with a path in a racetrack shape.

Referring now to FIG. 17, a linear motor 10' includes a path 14' which is closed on itself in a racetrack pattern. That is, path 14' includes straight and parallel runs 78 joined by curved ends 80. Movable stage 12 is driven, as described to any point on path 14'. By way of illustration, movable stage 12 may continue in one direction indefinitely, or may move in one direction, then in the other, without limitation. This freedom of movement is enabled by the wireless control and feedback described herein.

Figure 18:
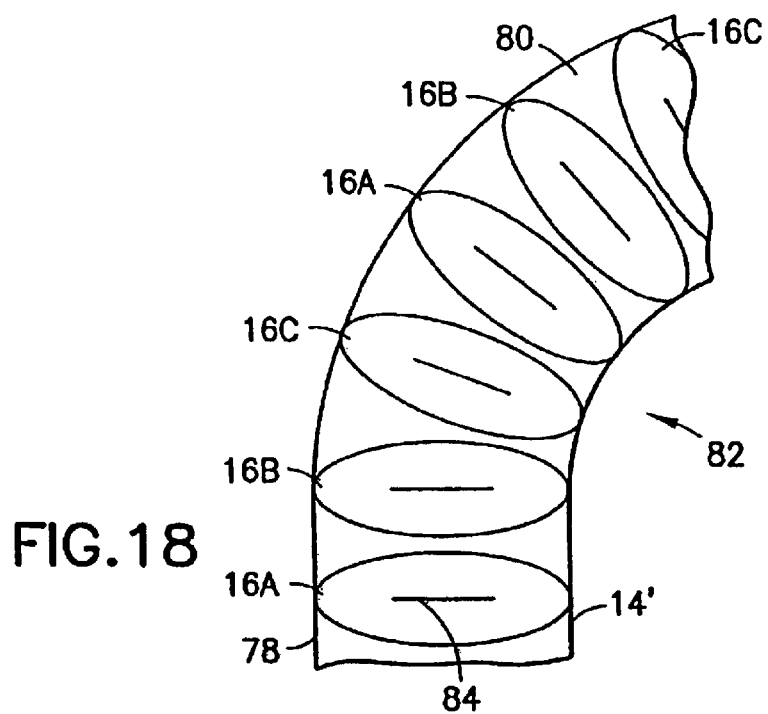
FIG. 18 is an enlarged view of a portion of a curved section of the path of FIG. 17.

Dashed box 82 in FIG. 17 is expanded in FIG. 18 to enable description.

Armature windings 16A, 16B and 16C include an axis 84, illustrated by a line in each armature winding. The axes 84 in runs 78 lie substantially parallel to each other, as shown in armature windings 16A and 16B at the lower left of the figure. Axes 84 in curved ends 80, however, do not lie parallel to each other. Instead, axes 84 in curved ends 80 are tilted with respect to each other so that they lie across the shortest transverse distance of path 14'. In this way, repeating sets of armature windings 16A, 16B and 16C at enabled to generate the desired force for urging movable stage 12 along path 14'.

One skilled in the art will recognize that accommodation should be made in the actuation times of switches 22A, 22B and 22C for the tilting of axes 84 in curved ends 80. One possibility includes adjusting an upstream-downstream dimension of armature windings 16A, 16B and 16C so that center-to-center dimensions between end ones of each set of four such windings in curved ends 80 remains the same as the center-to-center dimensions between corresponding windings in runs 78. In this manner, the span S of four armature windings 16 remains the same in curved ends 80 as the span S of 5+(n*4) motor magnets 160 (n=0, 1, 2, ...) in straight runs 78. Switching sensors 36 are located along curved ends 80 so that their respective switches are actuated at minimum-current times, as previously explained.

A racetrack shape, as in FIGS. 17 and 18 do not exhaust the possible shapes of path that can be attained with the present invention. Any shape can be accommodated.

Figure 19:
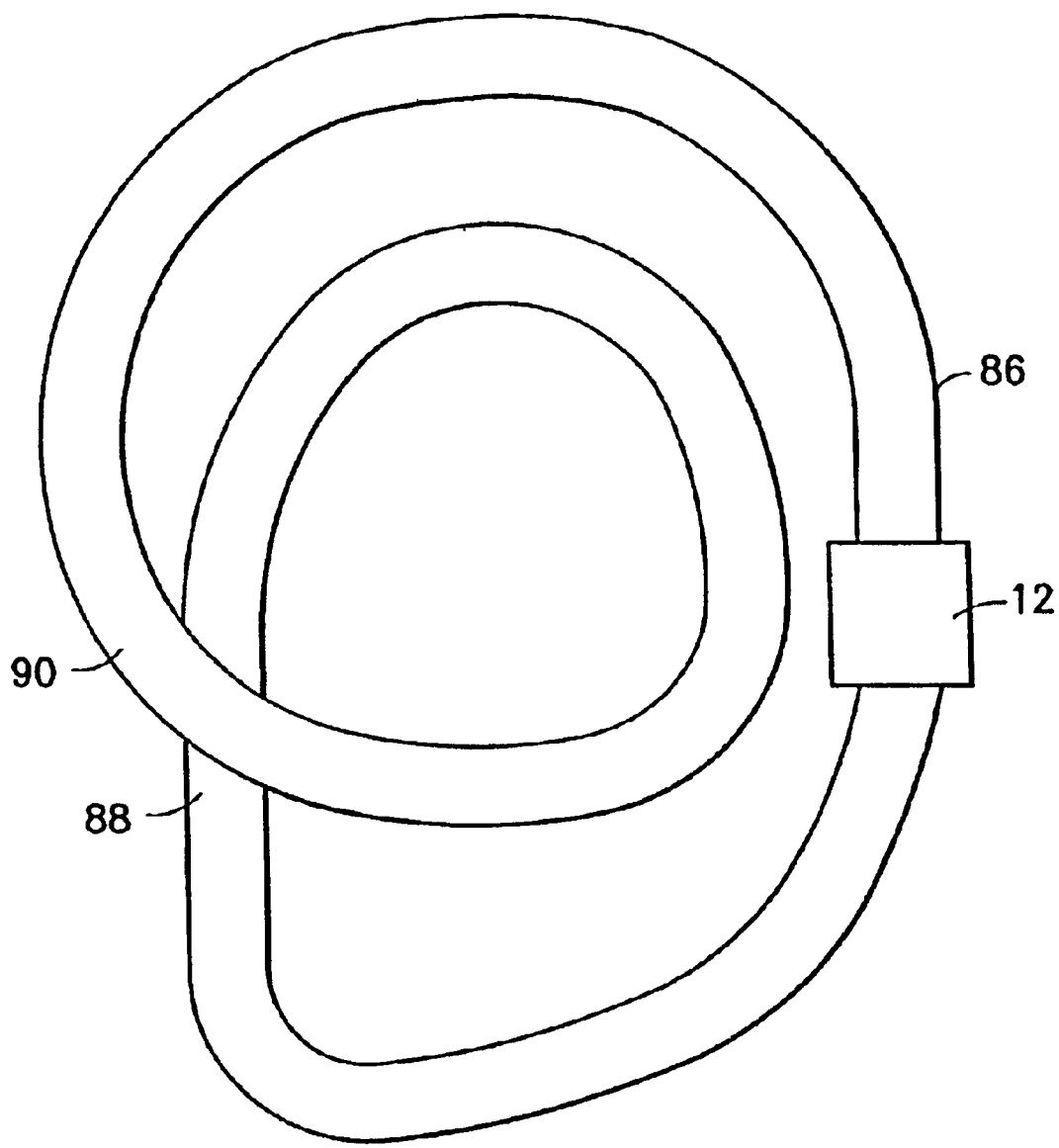
FIG. 19 is a diagram of a linear motor having path with multiple levels and wherein one portion of the path crosses over or under another portion of the path.

Referring now to FIG. 19, a multilevel path 86 is equally within the contemplation of the present invention. A lower portion 88 of path 86 passes under an upper portion 90, thereof. Movable stage 12 may be positioned anywhere on path 86. In cases where two or more movable stages 12 are employed on path 86, the possibility exists that one movable stage 12 may cross on upper portion 90 at the same time that a second movable stage 12 on lower portion 88 passes under upper portion 90.

Figure 20:
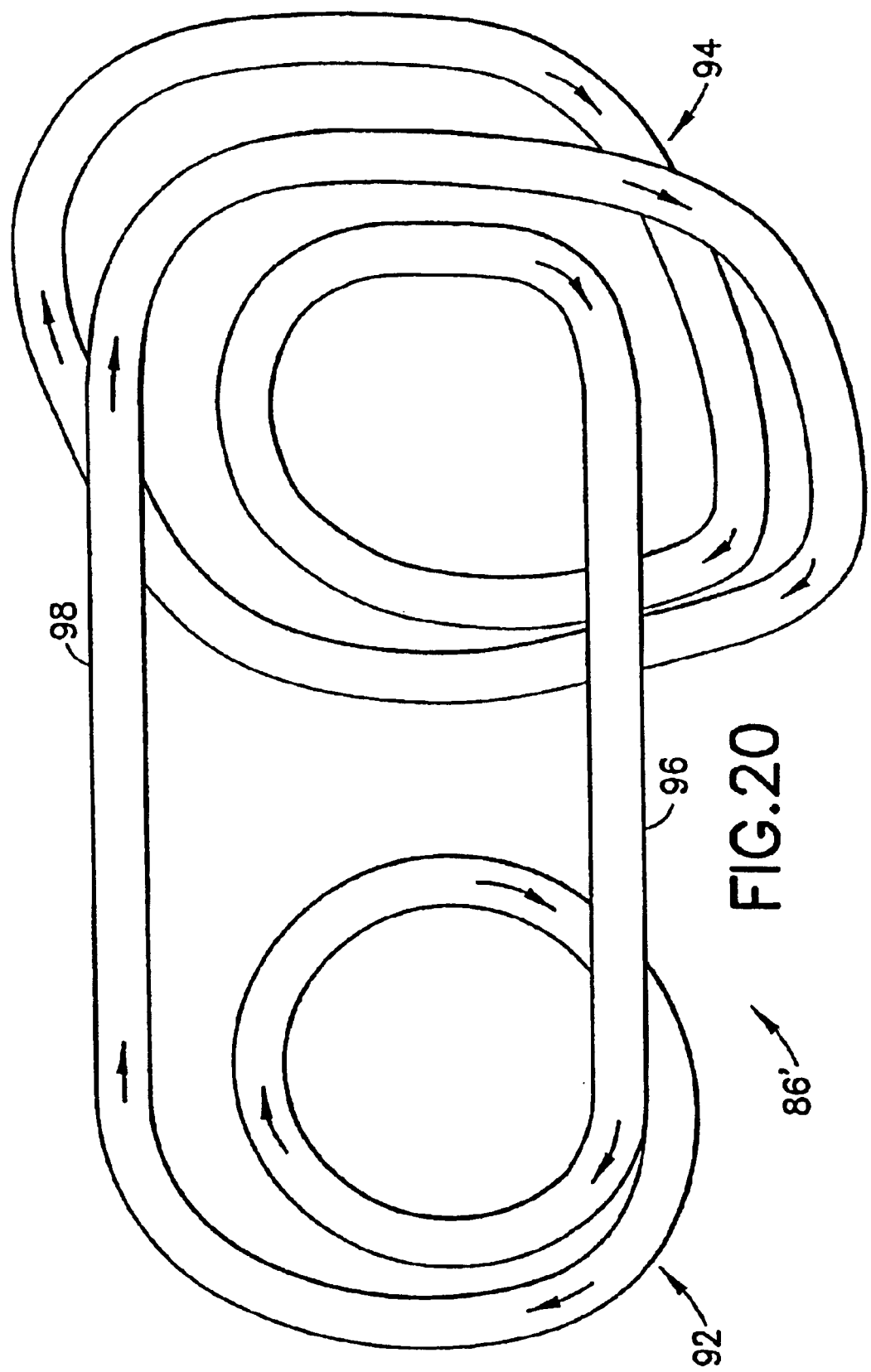
FIG. 20 is a diagram of a linear motor path consisting of two connected spirals, including multiple crossovers.

Referring now to FIG. 20, a further illustration of a multilevel path 86' includes a down spiral 92 aside a down and up spiral 94. Spirals 92 and 94 are connected into a single path 86' by crossing elements 96 and 98. Spiral paths are frequently seen in conveyor systems to increase the residence time of objects in a location. For example, in a bakery operation, spirals are frequently used to permit time for newly baked goods to cool, before being discharged to packaging or further processing.

Figure 21:
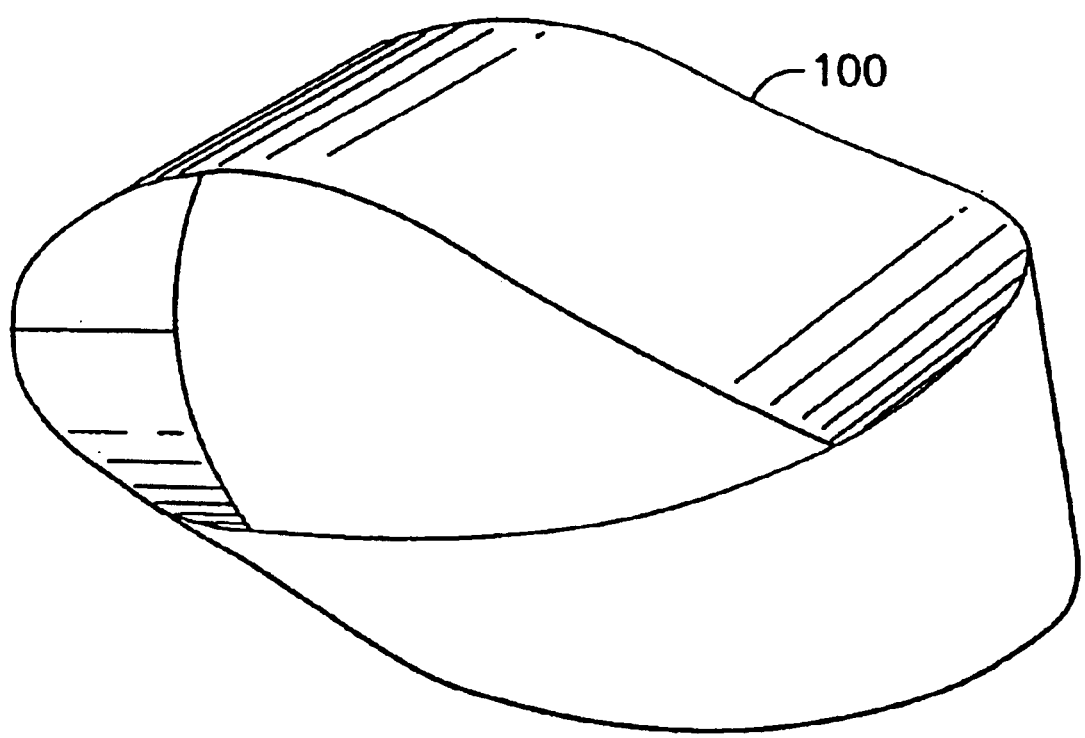
FIG. 21 is a diagram of a linear motor path in the shape of a Moebius band.

To illustrate the flexibility of the present invention, a path may be laid out as a Moebius band 100, as shown in FIG. 21. A Moebius band is characterized as having only a single edge and a single surface, rather than having two edges and two surfaces, as in other examples of paths in the above description. A toy Moebius band is constructed by making a half twist in a strip of paper and then connecting the ends together. One proves that the strip has only a single surface by drawing a line down the center of the strip. Eventually, the end of the line meets the beginning of the line without having turned the strip over. Similarly, one can draw a line along the edge of the strip, and find the end of the line joining the beginning of the line, without crossing over from one edge to the other, since the strip has only a single edge.

The views of paths in the foregoing should not be considered to be top views. Indeed, important applications of the invention include those in which movable stage 12 is located below its path. Especially in the case where the path includes magnetic material, motor magnets 160, and additional magnets 162 in movable stage 12 may be relied on to support movable stage by magnetic attraction to the magnetic material in the path. Other types of support are equally within the contemplation of the invention. In some cases, some portions of the path may be below and supporting movable stage 12, and other portions of the path may be above movable stage 12, as movable stage completes a full traverse of the path.

Figure 25:
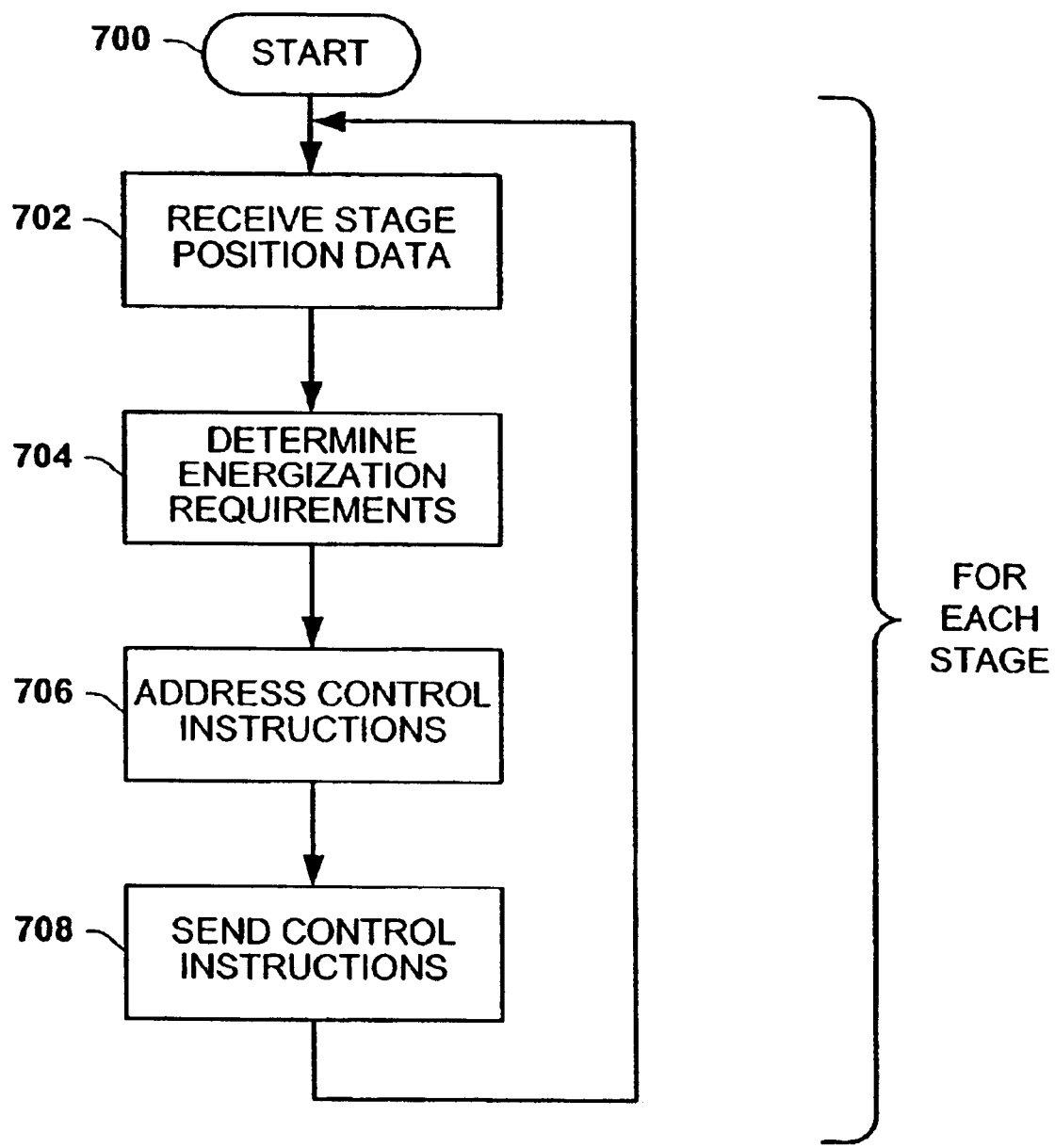
FIG. 25 is a flow diagram illustrating a methodology for controlling a linear motor system in accordance with the present invention.
Figure 26:
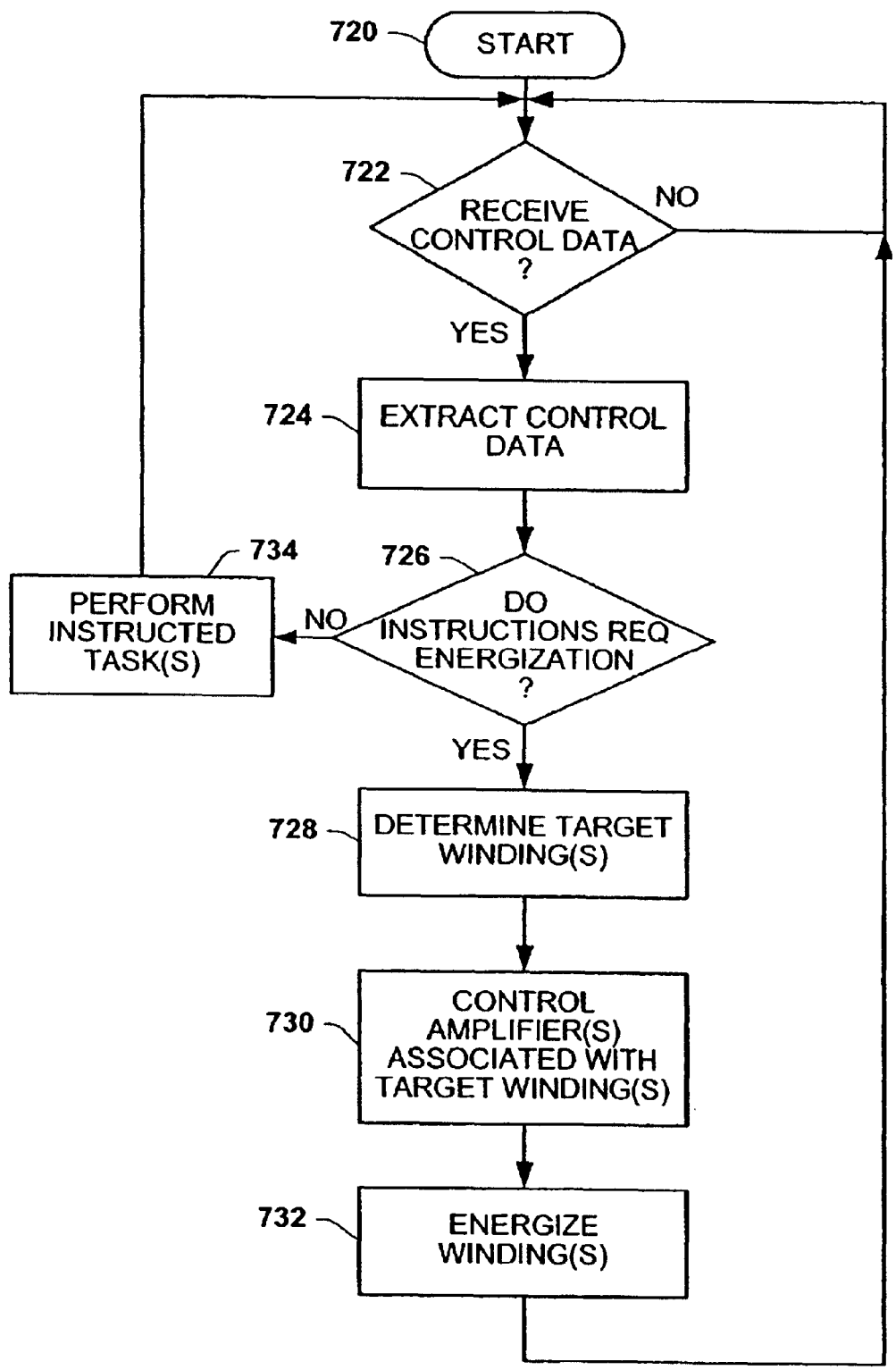
FIG. 26 is a flow diagram illustrating a methodology for controlling a path module in a linear motor system in accordance with the present invention.
Figure 27:
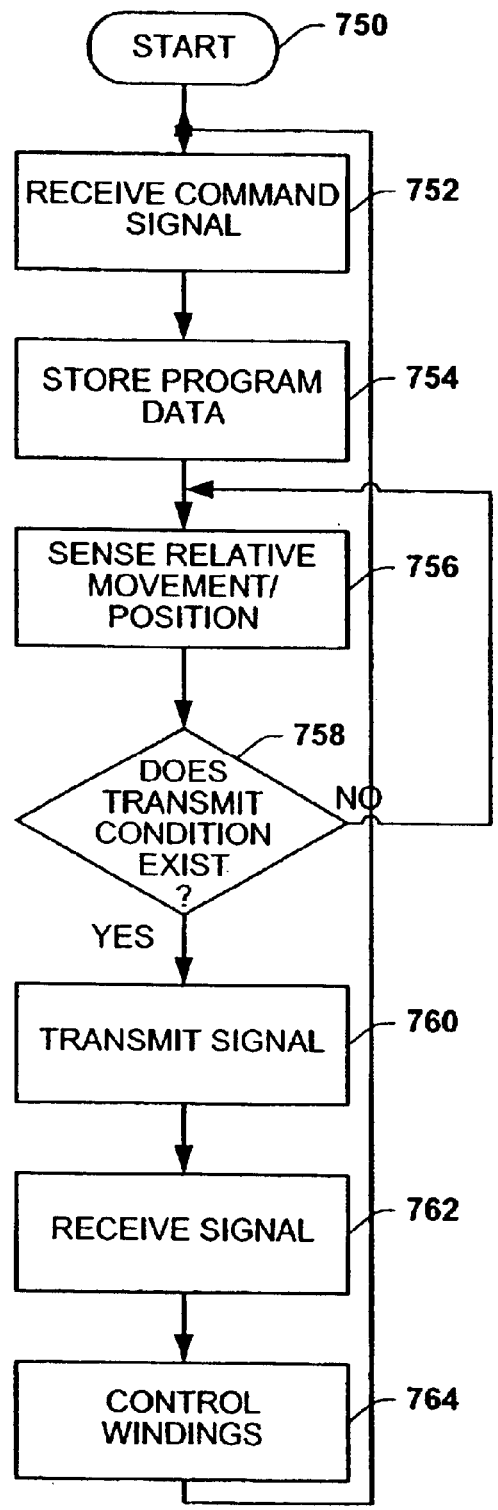
FIG. 27 is a flow diagram illustrating a methodology for controlling a linear motor system in accordance with the present invention.

In view of the foregoing structural and functional features described above, methodologies that may be implemented in accordance with the present invention will be better appreciated with reference to FIGS. 25, 26 and 27. While, for purposes of simplicity of explanation, the methodologies of FIGS. 25, 26 and 27 are shown and described as executing serially, it is to be understood and appreciated that the present invention is not limited by the illustrated orders, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that much of the following methodologies may be implemented as computer-executable instructions, such as software stored in a computer-readable medium or as hardware or as a combination of hardware and software.

FIG. 25 illustrates a methodology for controlling a linear motor system in accordance with an aspect of the present invention. The particular methodology may be implemented at a central motor controller, such as to control each stage that is moveable along the linear motor path. The methodology begins at 700, such as in response to powering up the linear motor system. Next, at 702, stage position data is received. The stage position data may be provided by one or more encoder systems. Examples of encoders that could be utilized, in accordance with an aspect of the present invention, include magnetic encoders, inductive encoders, capacitive encoders, and/or optical encoders. In addition, such encoders may provide their position data via a physical communications link and/or a wireless communications link employing a known communications protocol. An example of wireless arrangements in which the encoder data is transmitted from the stage, which could be implemented in accordance with the present invention, are illustrated in FIGS. 5, 5A, 6, 6A and 11. From 702, the methodology proceeds to 704.

At 704, energization requirements are determined to effect movement of the stage along the path. The determination, for example, may be made by a microprocessor programmed and configured with a look-up table that provides a current or voltage command signal as a function of stage position data. Alternatively or additionally, motor control algorithms may be implemented to calculate control requirements, such as may include the magnitude and direction of electric current that should be applied to which winding(s) to effect a desired movement of the stage. After the control requirements have been determined, the methodology proceeds to 706.

At 706, the control instructions are addressed to one or more target modules. In accordance with a particular aspect, the addressing (706) also may include addressing one or more target windings in a particular module. That is, each winding in the path may have a unique address in the path, such as corresponding to a module ID plus a winding ID, such as may identify phase A, B or C. Next, at 708, the addressed control instruction data is packetized and sent to one or more target path modules over a network or other communications link (e.g., wired or wireless) so as to energize selected windings in the target module(s). From 708, the methodology returns to 702 in which the process is repeated based on new position information that is received.

The foregoing example may be implemented for each stage that is moveable along the path. As a result, absolute encoding scheme for each stage is facilitated. As described below with respect to FIG. 26, such a control methodology further facilitates independent control of each winding along the path so as to enhance the precision that may be achieved in a linear motor system implemented according to such methodology. It is to be appreciated that, where more than one stage is moveable along the path, a position conflict algorithm may be employed to mitigate the likelihood of collisions.

FIG. 26 is a flow diagram illustrating an example of a methodology for controlling one or more windings associated with a path module in a linear motor system in accordance with an aspect of the present invention. The methodology begins at 720, such as at power up for the linear motor system. Next at 722, a determination is made as to whether a message, such as control instructions, has been addressed to the path module, such as based on the communications protocol implemented in the system. If no message is received at the module the methodology may loop back to 722 and the module may remain quiescent, although diagnostics and other background routines may still be performed. If a message is received, the methodology proceeds to 724.

At 724, control data is extracted from the received message. The control data, for example, may include an instruction to energize, calibration data to tune operating characteristics of the module and its associated components, or other data useful to the target path module and, more generally, to the linear motor system. Next, at 726, a determination is made as to the type of the control information. In particular, the determination may include discerning whether the instructions include a request to energize one or more windings in the module. If the control information indicates that one or more windings in the module are to be energized, the methodology proceeds to 728.

At 728, the target winding or windings, which are to be energized, are determined from the control information, such as based on address information in the received message. As mentioned above, each of the windings may be addressable so as to facilitate its independent control. Next, at 730, the amplifier associated with each target winding is controlled so as to effect desired energization thereof. Such control, for example, may include controlling a switching network (e.g., PWM control) to effect a desired magnitude and direction of electrical current through each target winding in the module for a defined duration. Each target winding in the module thus is energized (732) based on the control signals provided to the amplifier(s), such as to t provide an electric field to effect corresponding movement of the stage along the path. From 732, the methodology returns to 722 in which the methodology may repeat.

If the determination at 726 is negative, thereby indicating that the message does not contain instructions to energized one or more windings in the module, the methodology proceeds to 734. At 734, other tasks may be performed at the module based on the control information provided in the message. By way of example, the controller of the module may be programmed with update data to improve performance and/or associated sensors may be recalibrated to enhance associated sensing capabilities. Those skilled in the art will understand and appreciate other types of control information that may be provided to facilitate operation at a path module. From 734, methodology returns to 722 to continue monitoring for messages.

FIG. 27 illustrates a methodology of wireless encoding in accordance with an aspect of the present invention. The methodology begins at 750, such as at activation of a stage of linear motor in response to application of power. As mentioned above, in accordance with one aspect, a wireless encoder system may be programmed to transmit wireless encoder data periodically or after other predetermined conditions are met. By way of example, at 752, a wireless command signal may be received at the stage having command data indicative of operating characteristics to be implemented by the wireless encoder system. The command data may define operating parameters for a wireless transmitter of the encoder system and/or indicate operating parameters for an encoder sensor associated with the transmitter.

Next, at 754, the command data is stored as program data, such as in memory at the stage. The memory, for example, may be part of the transmitter or be coupled to a control processor. In order to mitigate energy losses due to programming, the program data may include data identifying one of a fixed number of predefined programs. Alternatively, individual operating parameters could be provided in the command signal to set desired operating parameters to values different from default values. Examples of such parameters include transmission rate, modulation technique, communications protocol, receiver address, sensing characteristics for the encoder sensor, etc.

After activation and after the encoder system has been appropriately configured (e.g., either based on received command data or previously stored program data), relative movement and/or position between the stage and a path is sensed (756). As described herein, the sensing may be implemented as an optical system, an inductive system, a magnet system, and/or a capacitive system in which the sensor is moveable with the stage. Next, at 758, a determination is made as to whether a transmit condition exists.

By way of illustration, the determination at 758 may include comparing a counter value with a stored command count value, which counter value may be adjusted (incremented or decremented) based on the sensed movement of the stage relative to the path. Alternatively, a receiver moveable with the stage may receive a command signal that triggers the transmitter to transmit the wireless signal. In another aspect, a processor also moveable with the stage may control operation of the transmitter based on the sensed encoder data and/or based on a wireless command signal received from the motor controller. If the determination at 758 is negative, the methodology returns to 506 in which the movement/position is continued to be sensed. If a transmit condition exists, however, the methodology proceeds to 760.

At 760, a wireless transmitter signal is transmitted. The transmitter signal, for example, may include a value indicative of the position and/or movement of the stage relative to the path.

By way of further example, the transmitter signal may include a unique ID or address identifying the stage from which the transmission originated. Such address information facilitates control of a system having multiple stages that are operated by a common remote motor control system. Additionally, a unique ID further may be associated with an encoder sensing system for each axis, such that the motor controller may differentiate between encoder data for each axis being traversed.

The transmitter signal is received at 762, such as at a remote data receiver associated with the motor controller. The motor controller, in turn, processes the received signal to determine the position and/or velocity of the stage. As a result, the motor controller may selectively control energization of armature windings (764) to effect desired movement of the stage along the path. From 764, the methodology returns to 752 in which the methodology may repeat.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A path module for a linear motor, comprising:
   at least one armature winding;
   an amplifier connected to the at least one armature winding; and
   a module controller coupled to the amplifier, the module controller being operative to control the amplifier to selectively energize the at least one armature winding based on instructions received from motor controller, the path module being end-to-end connectable to at least one other path module to define a path, each module in the path having a different address so as to facilitate independent control of armature windings in the path.

2. The path module of claim 1, further comprising a plurality of armature windings, the module controller being operative to control the amplifier to selectively energize each of the plurality of armature windings based on the instructions received from the motor controller.

3. The path module of claim 2, further comprising an amplifier associated with each of the plurality of armature windings in the path module, each amplifier being operative to control energization of an associated armature winding in the path module based on control information from the module controller.

4. The path module of claim 3, wherein each armature winding has a unique address to facilitate independent control of each respective armature winding based on instructions received from a the motor controller addressed to each respective armature winding.

5. The path module of claim 1, further comprising a plurality of the path modules connected together, the at least one armature winding in each of the plurality of path modules being arranged so as to define the path, the armature windings in the path being independently addressable through each associated module controller, such that independent control of the armature windings is facilitated.

6. The path module of claim 1, further comprising an encoder sensor operative to provide an output signal to a communications line indicative of at least one of incremental and absolute changes in position of a stage relative to the path module.

7. The path module of claim 6, wherein the encoder sensor further comprises a magnetic encoder sensor responsive to an encoder magnet of a stage, the encoder magnet having an effective length.

8. The path module of claim 7, wherein the path module is connectable to an adjacent path module having at least one encoder sensor, such that when the path module is connected to the adjacent path module, the at least one encoder sensor of the path module and the at least one sensor of the adjacent path module are separated by no more than the effective length.

9. The path module of claim 1, further comprising at least one sensor operative to sense a condition of the path module and provide a signal indicative of the sensed condition to the module controller.

10. A path module for a linear motor, comprising:
a plurality of non-interlaced armature windings;
an amplifier connected to the plurality of armature windings; and
a module controller coupled to the amplifier, the module controller being programmed to control the amplifier to selectively energize the plurality of armature windings based on instructions received from a remote motor controller, the path module being end-to-end connectable to at least one other path module to define a path,
wherein each armature winding has a unique address to facilitate independent control of each respective armature winding based on instructions from the motor controller addressed to each respective armature winding.

11. The path module of claim 10, further comprising an amplifier associated with each of the plurality of armature windings in the path module, each amplifier being operative to control energization of an associated one of the plurality of armature windings based on control information in the module controller.

12. A linear motor system, comprising:
a plurality of path modules, each of the plurality of path modules comprising:
at least one armature winding;
an amplifier connected to the at least one armature winding; and
a module controller associated with the amplifier and operative to control the amplifier to selectively energize the at least one armature winding based on control instructions via a communication link;
each of the plurality of path modules being connected end-to-end to at least one adjacent path module to define a path;
a stage moveable along the path; and
wherein the module controller of each of the plurality of path modules is operative to receive respective control instructions via the communications link, the module controller of each of the plurality of path modules further being operative to control an associated amplifier to selectively energize the at least one armature winding associated therewith based on the control instructions received by the associated module controller so as to effect movement of the stage along the path.

13. The system of claim 12, wherein the at least one armature winding further comprises a plurality of armature windings, the module controller of each of the plurality of path modules being operative to control each respective amplifier to selectively energize each of the plurality of armature windings based on the control instructions received by the associated module controller.

14. The system of claim 13, wherein the module controller of each of the plurality of path modules further comprises an amplifier associated with each of the plurality of armature windings in the associated path module, each amplifier being operative to control energization of an associated armature winding.

15. The system of claim 12, further comprising a system controller operative to provide the control instructions to each of the plurality of path modules via the communications link so as to control the at least one armature winding associated with each of the plurality of path modules.

16. The system of claim 15, wherein the communications link employs an addressable communications protocol in which each of the plurality of path modules in the path has a different address, the system controller providing the control instructions according to the address of each of the plurality of path modules.

17. The system of claim 15, wherein each armature winding in the path has a different address, the system controller utilizing the address of each of the armature windings in the path to effect substantially independent control of the armature windings.

18. The system of claim 17, wherein the at least one armature winding further comprises a plurality of armature windings, the module controller of each of the plurality of path modules being operative to control each respective amplifier to selectively energize each of the plurality of armature windings based on the address associated with control instructions received by the respective module controller.

19. The system of claim 18, wherein the module controller of each of the plurality of path modules further comprises an amplifier associated with each of the plurality of armature windings in respective path module, each amplifier being operative to control energization of an associated armature winding.

20. The system of claim 15, wherein the system controller is operative to receive encoder data indicative at least one of incremental and absolute changes in position of the stage relative the path, the system controller providing the control instructions based on the encoder data.

21. The system of claim 20, further comprising at least one receiver coupled to the system controller, the at least one receiver being operative to receive a wireless signal having at least some of the encoder data.

22. The system of claim 12, wherein at least some of the plurality of path modules further comprise at least one sensor operative to sense a condition of the respective path module and provide sensor data indicative of the sensed condition via the communications link.

23. The system of claim 22, further comprising a computer coupled to the communications link and operative to collect the sensor data.

24. The system of claim 23, wherein the computer further comprises computer executable instructions to analyze operating characteristics of the linear motor system based on the sensor data and provide an indication of the operating characteristics.

25. A path module for a linear motor, comprising:
field means for providing an electric field;
amplifier means for controlling the electric field provided by the field means; and
control means for selectively controlling the amplifier means based on instructions identifying the field means, the path module being end-to-end connectable to at least one other path module to define a path, whereby each module in the path has a different address so as to facilitate independent control of different field means in the path.

26. A linear motor system, comprising:
a plurality of path modules, each path module comprising:
field means for providing an electric field;
amplifier means for controlling the electric field provided by the field means; and
control means for selectively controlling the amplifier means based on instructions identifying the field means;
each of the plurality of path modules being connected end-to-end to at least one adjacent path module to define path;

support means moveable along the path; and communication means for communicating control information to each of the control means in the linear motor system, each control means being operative to control the respective amplifier means to selectively energize the field means associated therewith based on the control instructions receive by the respective control means so as to control movement of the support means along the path.

27. A method for controlling a path module in a linear motor system, comprising:

receiving at a controller of the path module via communications link control instructions from a motor controller;

providing control data to an amplifier of the path module to selectively energize at least one armature winding of the path module based on the control instructions, the control instructions identifying the at least one armature winding; and receiving encoder data at the motor controller indicative of at least one of movement and position of a stage relative to a path provided by the linear motor system, the control instructions being provided based on the encoder data.

28. The method of claim 27, wherein the encoder data is received at the motor controller via the communications link.

29. The method of claim 27, wherein the encoder data is received at the motor controller via a wireless receiver operatively associated with the motor controller.

30. The method of claim 27, wherein the path module includes a plurality of armature windings and an amplifier associated with each of the plurality of armature windings in the path module, the method further comprising controlling each amplifier to control energization of an associated one of the plurality of armature windings based on the control instructions received at the path module from the motor controller.

31. The method of claim 30, further comprising addressing the control instructions for receipt by the controller of the path module so as to effect energization of at least one of the selected armature windings in the path module.

* * * * *